(12) United States Patent
Milbar et al.

(10) Patent No.: US 7,305,043 B2
(45) Date of Patent: Dec. 4, 2007

(54) METHOD AND APPARATUS FOR FORMATTING SIGNALS FOR DIGITAL AUDIO BROADCASTING TRANSMISSION AND RECEPTION

(75) Inventors: Marek Milbar, Huntingdon Valley, PA (US); James C. Stekas, Murray Hill, NJ (US)

(73) Assignee: iBiquity Digital Corporation, Columbia, MD (US)

( * ) Notice: Subject to any disclaimer, the term of this patent is extended or adjusted under 35 U.S.C. 154(b) by 264 days.

(21) Appl. No.: 10/465,443

(22) Filed: Jun. 19, 2003

(65) Prior Publication Data

US 2004/0076188 A1    Apr. 22, 2004

Related U.S. Application Data

(60) Provisional application No. 60/419,259, filed on Oct. 17, 2002.

(51) Int. Cl.
*H04L 27/00* (2006.01)
(52) U.S. Cl. ..................................... 375/295
(58) Field of Classification Search ............... 375/260, 375/295, 130, 146, 147; 381/2, 3; 370/206, 370/203, 210
See application file for complete search history.

(56) References Cited

U.S. PATENT DOCUMENTS

| 6,075,789 A | 6/2000 | Kasslin et al. |
| 6,188,717 B1 | 2/2001 | Kaiser et al. |
| 6,289,000 B1 | 9/2001 | Yonge, III |
| 6,788,690 B2 * | 9/2004 | Harri ................. 370/395.52 |
| 2003/0092376 A1 * | 5/2003 | Syed ..................... 455/3.06 |

OTHER PUBLICATIONS

U.S. Appl. No. 09/382,716, filed Aug. 24, 1999, Kroeger et al.

* cited by examiner

*Primary Examiner*—Tesfaldet Bocure
(74) *Attorney, Agent, or Firm*—Robert P. Lenart, Esq.; Pietragallo Bosick & Gordon, LLP

(57) ABSTRACT

A method for digital audio broadcasting comprising the steps of receiving a plurality of data bits to be transmitted, formatting the plurality of data bits into a plurality of protocol data units, inserting header bits at spaced locations within the protocol data units, and using the protocol data units to modulate a plurality of carriers to produce an output signal. The individual header bits can be positioned at evenly spaced locations in the protocol data units. A first one of the header bits can be offset from an end of the protocol data unit. A method of receiving the digital audio broadcasting signal the transmitters and receivers that operate in accordance with the methods are also provided.

48 Claims, 16 Drawing Sheets

METHOD AND APPARATUS FOR FORMATTING SIGNALS FOR DIGITAL AUDIO BROADCASTING TRANSMISSION AND RECEPTION

CROSS-REFERENCE TO RELATED PATENT APPLICATION

This application claims the benefit of U.S. Provisional Patent Application Ser. No. 60/419,259, filed Oct. 17, 2002, the disclosure of which is hereby incorporated by reference.

FIELD OF THE INVENTION

This invention relates to In-Band On-Channel (IBOC) Digital Audio Broadcasting (DAB), and more particularly to methods and apparatus for formatting signals for DAB transmission and reception.

BACKGROUND OF THE INVENTION

IBOC DAB systems are designed to permit a smooth evolution from current analog Amplitude Modulation (AM) and Frequency Modulation (FM) radio to a fully digital In-Band On-Channel system. These systems can deliver digital audio and data services to mobile, portable, and fixed receivers from terrestrial transmitters in the existing Medium Frequency (MF) and Very High Frequency (VHF) radio bands. Broadcasters may continue to transmit analog AM and FM simultaneously with the new, higher-quality and more robust digital signals, allowing conversion from analog to digital radio while maintaining current frequency allocations.

Digital Audio Broadcasting (DAB) can provide digital-quality audio, superior to existing analog broadcasting formats. Both AM and FM In-Band On-Channel DAB signals can be transmitted in a hybrid format where the digitally modulated signal coexists with the currently broadcast analog signal, or in an all-digital format where the analog signal has been eliminated. IBOC DAB requires no new spectral allocations because each IBOC DAB signal is transmitted within the spectral mask of an existing AM or FM channel allocation. IBOC DAB promotes economy of spectrum while enabling broadcasters to supply digital quality audio to the present base of listeners.

One AM IBOC DAB system, set forth in U.S. Pat. No. 5,588,022, presents a method for simultaneously broadcasting analog and digital signals in a standard AM broadcasting channel. Using this approach, an amplitude-modulated radio frequency signal having a first frequency spectrum is broadcast. The amplitude-modulated radio frequency signal includes a first carrier modulated by an analog program signal. Simultaneously, a plurality of digitally modulated carrier signals are broadcast within a bandwidth that encompasses the first frequency spectrum. Each digitally modulated carrier signal is modulated by a portion of a digital program signal. A first group of the digitally modulated carrier signals lies within the first frequency spectrum and is modulated in quadrature with the first carrier signal. Second and third groups of the digitally-modulated carrier signals lie in upper and lower sidebands outside of the first frequency spectrum and are modulated both in-phase and in-quadrature with the first carrier signal. Multiple carriers employ orthogonal frequency division multiplexing (OFDM) to bear the communicated information.

FM IBOC DAB systems have been the subject of several United States patents including U.S. Pat. Nos. 6,108,810; 5,949,796; 5,465,396; 5,315,583; 5,278,844 and 5,278,826. In an FM compatible digital audio broadcasting system, digitally encoded audio information is transmitted simultaneously with the existing analog FM signal channel. The advantages of digital transmission for audio include better signal quality with less noise and wider dynamic range than with existing FM radio channels. Initially the hybrid format would be used allowing existing receivers to continue to receive the analog FM signal while allowing new IBOC DAB receivers to decode the digital signal. Sometime in the future, when IBOC DAB receivers are abundant, broadcasters may elect to transmit the all-digital format. Hybrid IBOC DAB can provide virtual CD-quality stereo digital audio (plus data) while simultaneously transmitting the existing FM signal. All-digital IBOC DAB can provide virtual CD-quality stereo audio along with a data channel.

One proposed FM IBOC DAB uses a signal that includes orthogonal frequency division multiplexed (OFDM) subcarriers in the region from about 129 kHz to 199 kHz away from the FM center frequency, both above and below the spectrum occupied by an analog modulated host FM carrier. One IBOC DAB option permits subcarriers starting as close as 100 kHz away from the center frequency. The bandwidth of the existing analog FM signal is significantly smaller than the bandwidth occupied by the OFDM subcarriers.

OFDM signals include a plurality of orthogonally spaced carriers all modulated at a common symbol rate. The frequency spacing for the pulse symbols (e.g., BPSK, QPSK, 8PSK or QAM) is equal to the symbol rate. For IBOC transmission of FM DAB signals, redundant sets of OFDM subcarriers are placed in an upper sideband (USB) and a lower sideband (LSB) on either side of a coexisting analog FM carrier. The DAB subcarrier power is set to about −25 dB relative to the FM signal. The level and spectral occupancy of the DAB signal is set to limit interference to its FM host while providing adequate signal-to-noise ratio (SNR) for the DAB subcarriers. Certain ones of the subcarriers can be reserved as reference subcarriers to transmit control signals to the receivers.

One feature of digital transmission systems is the inherent ability to simultaneously transmit both digitized audio and data. Digital audio information is often compressed for transmission over a bandlimited channel. For example, it is possible to compress the digital source information from a stereo compact disk (CD) at approximately 1.5 Mbps down to 96 kbps while maintaining the virtual-CD sound quality for FM IBOC DAB. Further compression down to 48 kbps and below can still offer good stereo audio quality, which is useful for the AM DAB system or a low-latency backup and tuning channel for the FM DAB system. Various data services can be implemented using the composite DAB signal. For example, a plurality of data channels can be broadcast within the composite DAB signal.

U.S. patent application Ser. No. 09/382,716, filed Aug. 24, 1999, and titled "Method And Apparatus For Transmission And Reception Of Compressed Audio Frames With Prioritized Messages For Digital Audio Broadcasting" discloses a method and apparatus for assembling modem frames for transmission in IBOC DAB systems, and is hereby incorporated by reference.

The present invention provides methods and apparatus for implementing signal processing aspects of IBOC DAB systems.

SUMMARY OF THE INVENTION

This invention provides a method for digital audio broadcasting comprising the steps of receiving a plurality of data bits to be transmitted, formatting the plurality of data bits into a plurality of protocol data units, inserting header bits at spaced locations within the protocol data units, and using the protocol data units to modulate a plurality of carriers to produce an output signal.

The individual header bits can be positioned at evenly spaced locations in the protocol data units. A first one of the header bits can be offset from an end of the protocol data units.

The method can further comprise the step of scrambling the plurality of data bits by generating a pseudorandom code and modulo-2 adding the pseudorandom code and the data bits.

The protocol data units can be processed in a plurality of logical channels and each logical channel is scrambled and encoded separately, to form a maximal-length scrambling sequence using linear feedback shift register with a primitive polynomial.

The plurality of bits can be interleaved, assigned to partitions, and mapped to frequency partitions.

Transmitters that broadcast in accordance with the above method are also included.

In another aspect, the invention encompasses a method for receiving a digital audio broadcasting signal, the method comprising the steps of: receiving a digital audio broadcasting signal comprising a plurality of carriers modulated by a plurality of protocol data units, each of the plurality of protocol data units comprising a plurality of data bits and a plurality of header bits at spaced locations within the protocol data units; and producing an output signal in response to the digital audio broadcasting signal. Receivers that operate in accordance with the method are also included.

DETAILED DESCRIPTION OF THE INVENTION

Figure 1:
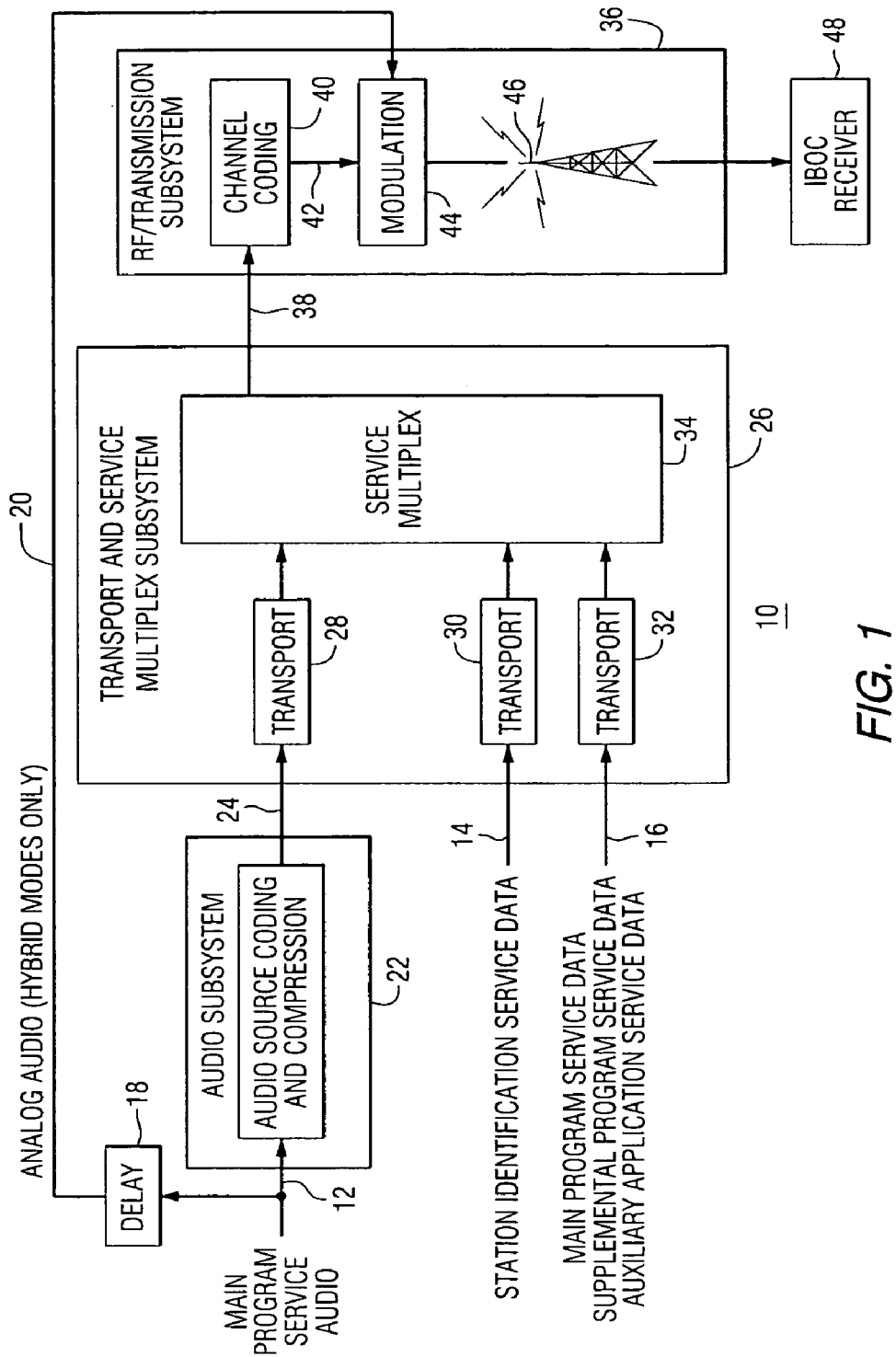
FIG. 1 is a functional block diagram of a transmitter for use in a digital audio broadcasting system.

Referring to the drawings, FIG. 1 is a functional block diagram of a transmitter 10 for use in a digital audio broadcasting system. The transmitter includes an input 12 for receiving a main program service audio signal, an input 14 for receiving station identification service data, and an input 16 for receiving main program service data, supplemental program service data, and auxiliary application service data. For hybrid DAB, the analog version of the main program service audio signal is delayed as shown by block 18 to produce a delayed analog audio signal on line 20. An audio subsystem 22 encodes and compresses the main program service audio signal to produce an encoded compressed digital signal on line 24. A transport and service multiplex subsystem 26 receives the encoded compressed digital signal, the station identification service data, the main program service data, supplemental program service data, and auxiliary application service data, and subjects those signals to various transport signal processing as discussed further below and representing in FIG. 1 as blocks 28, 30 and 32. The resulting signals are multiplexed by service multiplexer 34 and sent to the RF transmission subsystem 36. The digital signal on line 38 is channel coded as shown by block 40 and the resulting coded signal on line 42 is modulated along with the analog audio signal as illustrated by block 44. The resulting signal can then be amplified and broadcast by antenna 46 to at least one of a plurality of IBOC DAB receivers 48.

The system employs coding to reduce the sampled audio signal bit rate and baseband signal processing and to increase the robustness of the signal in the transmission channel. This allows a high quality audio signal plus ancillary data to be transmitted in band segments and at low levels which do not interfere with the existing analog signals.

IBOC DAB signals can be transmitted in a hybrid format including an analog modulated carrier in combination with a plurality of digitally modulated carriers or in an all-digital format wherein the analog modulated carrier is not used.

Channel encoding is used to add redundancy to each of the logical channels to improve the reliability of the transmitted information. The code rate defines the increase in overhead on a coded channel resulting from channel encoding. The code rate is the ratio of information bits to the total number of bits after coding.

Convolutional encoding can be used. Convolutional encoding is a form of forward-error-correction channel encoding that inserts coding bits into a continuous stream of information bits to form a predictable structure. Unlike a block encoder, a convolutional encoder has memory, and its output is a function of current and previous inputs.

Diversity delay provides a fixed time delay in one of two channels carrying the same information to defeat non-stationary channel impairments such as fading and impulsive noise.

Figure 2:
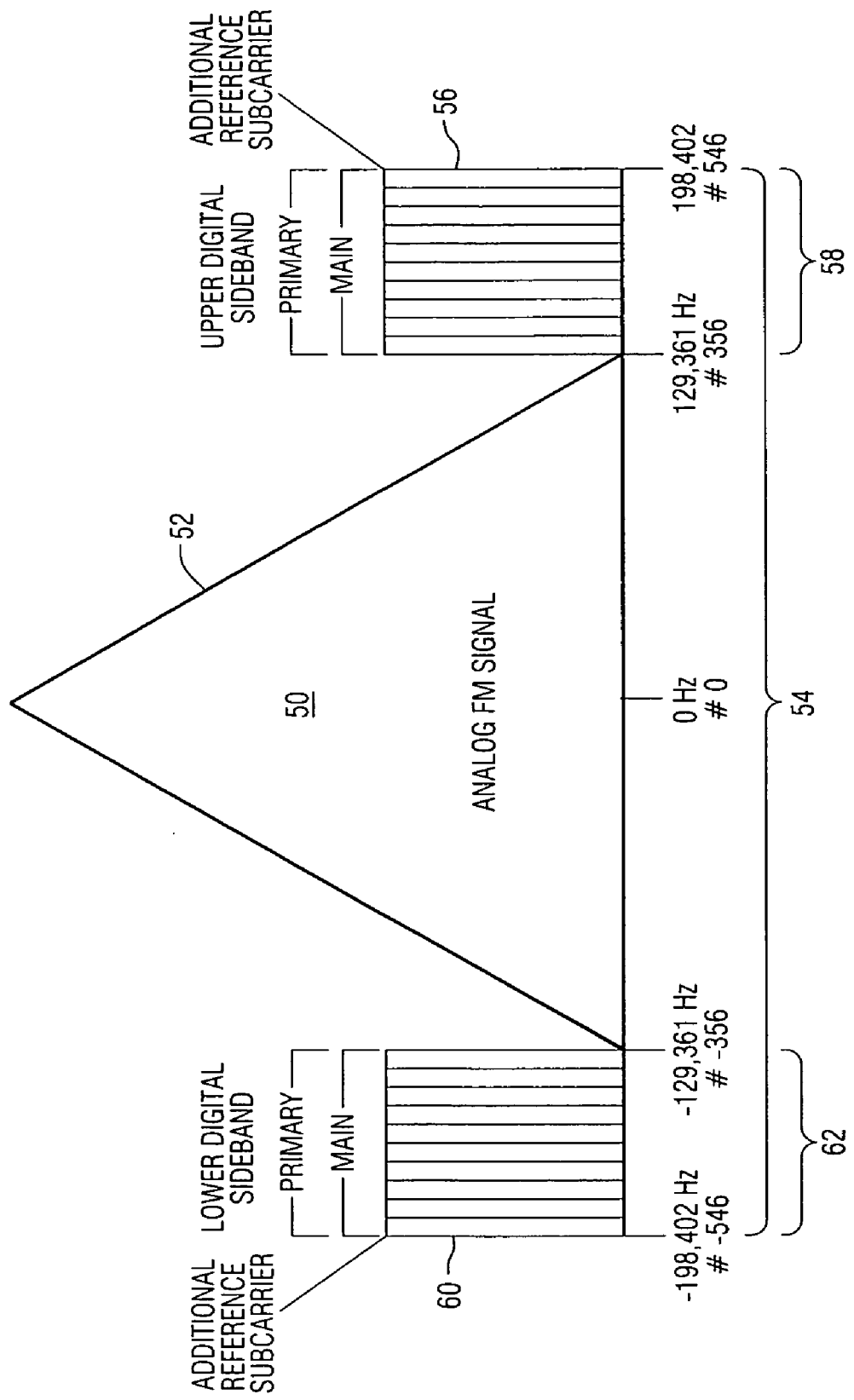
FIG. 2 is a schematic representation of a hybrid FM IBOC waveform.

FIG. 2 is a schematic representation of a hybrid FM IBOC waveform 50. The waveform includes an analog modulated signal 52 located in the center of a broadcast channel 54, a first plurality of evenly spaced orthogonally frequency division multiplexed subcarriers 56 in an upper sideband 58, and a second plurality of evenly spaced orthogonally frequency division multiplexed subcarriers 60 in a lower sideband 62. The digitally modulated subcarriers are broadcast at a lower power level than the analog modulated carrier to comply with required channel signal masks. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated Primary Main subcarriers. The subcarriers are located at evenly spaced frequency locations. The subcarrier locations are numbered from −546 to +546. In the waveform of FIG. 2, the subcarriers are at locations +356 to +546 and −356 to −546. This waveform will normally be used during an initial transitional phase preceding conversion to the All Digital waveform.

The digital signal is transmitted in primary main sidebands on either side of the analog FM signal, as shown in FIG. 2. Each primary main sideband is comprised of ten frequency partitions, which are allocated among subcarriers 356 through 545, or −356 through −545. Subcarriers 546 and −546, also included in the primary main sidebands, are additional reference subcarriers. The amplitude of each subcarrier can be scaled by an amplitude scale factor.

Figure 3:
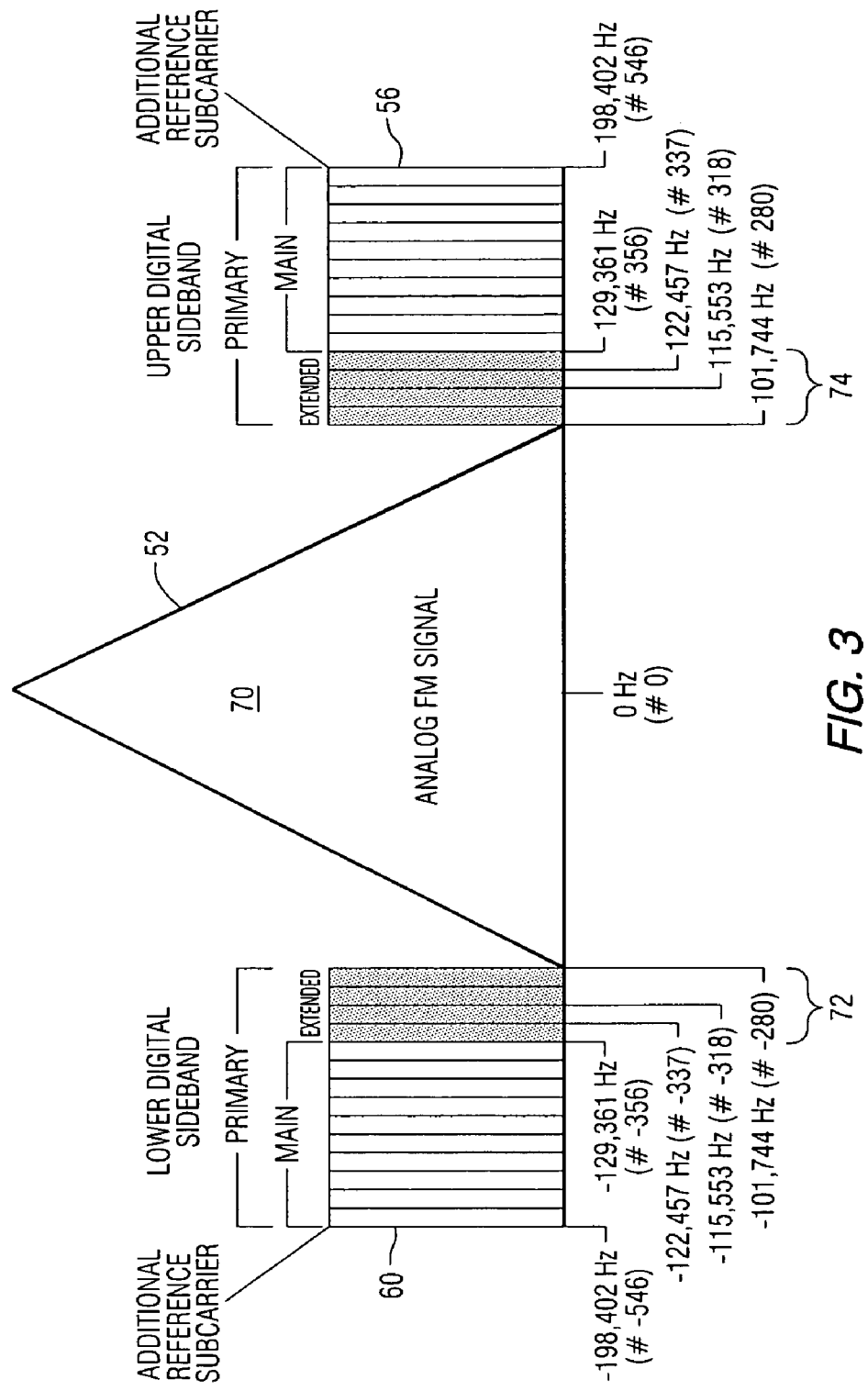
FIG. 3 is a schematic representation of an extended hybrid FM IBOC waveform.

FIG. 3 is a schematic representation of an extended hybrid FM IBOC waveform 70. The extended hybrid waveform is created by adding primary extended sidebands 72, 74 to the primary main sidebands present in the hybrid waveform. Depending on the service mode, one, two, or four frequency partitions can be added to the inner edge of each primary main sideband.

The Extended Hybrid waveform includes the analog FM signal plus digitally modulated primary main subcarriers (subcarriers +356 to +546 and −356 to −546) and some or all primary extended subcarriers (subcarriers +280 to +355 and −280 to −355). This waveform will normally be used during an initial transitional phase preceding conversion to the All Digital waveform.

Each primary main sideband includes ten frequency partitions and an additional reference subcarrier spanning subcarriers 356 through 546, or −356 through −546. The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
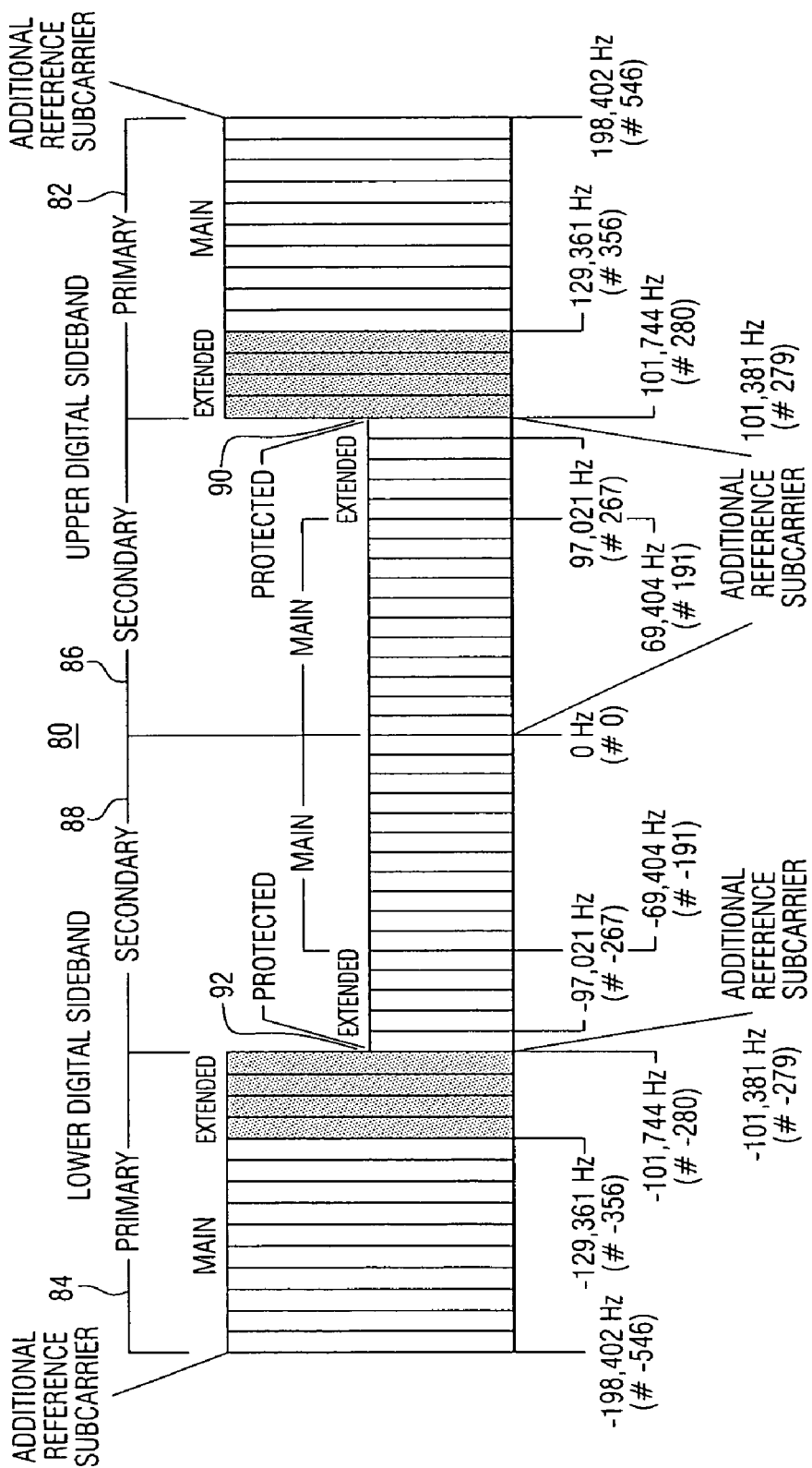
FIG. 4 is a schematic representation of an all-digital FM IBOC waveform.

FIG. 4 is a schematic representation of an all-digital FM IBOC waveform 80. The all-digital waveform is constructed by disabling the analog signal, fully expanding the bandwidth of the primary digital sidebands 82, 84, and adding lower-power secondary sidebands 86, 88 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the All Digital waveform. Each secondary sideband also has ten Secondary Main (SM) and four Secondary Extended (SX) frequency partitions. Unlike the primary sidebands, however, the Secondary Main frequency partitions are mapped nearer to the channel center with the extended frequency partitions farther from the center.

Each secondary sideband also supports a small Secondary Protected (SP) region 90, 92 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each Secondary Main sideband spans subcarriers 1 through 190 or −1 through −190. The upper Secondary Extended sideband includes subcarriers 191 through 266, and the upper Secondary Protected sideband includes subcarriers 267 through 278, plus additional reference subcarrier 279. The lower Secondary Extended sideband includes subcarriers −191 through −266, and the lower Secondary Protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

Figure 5:
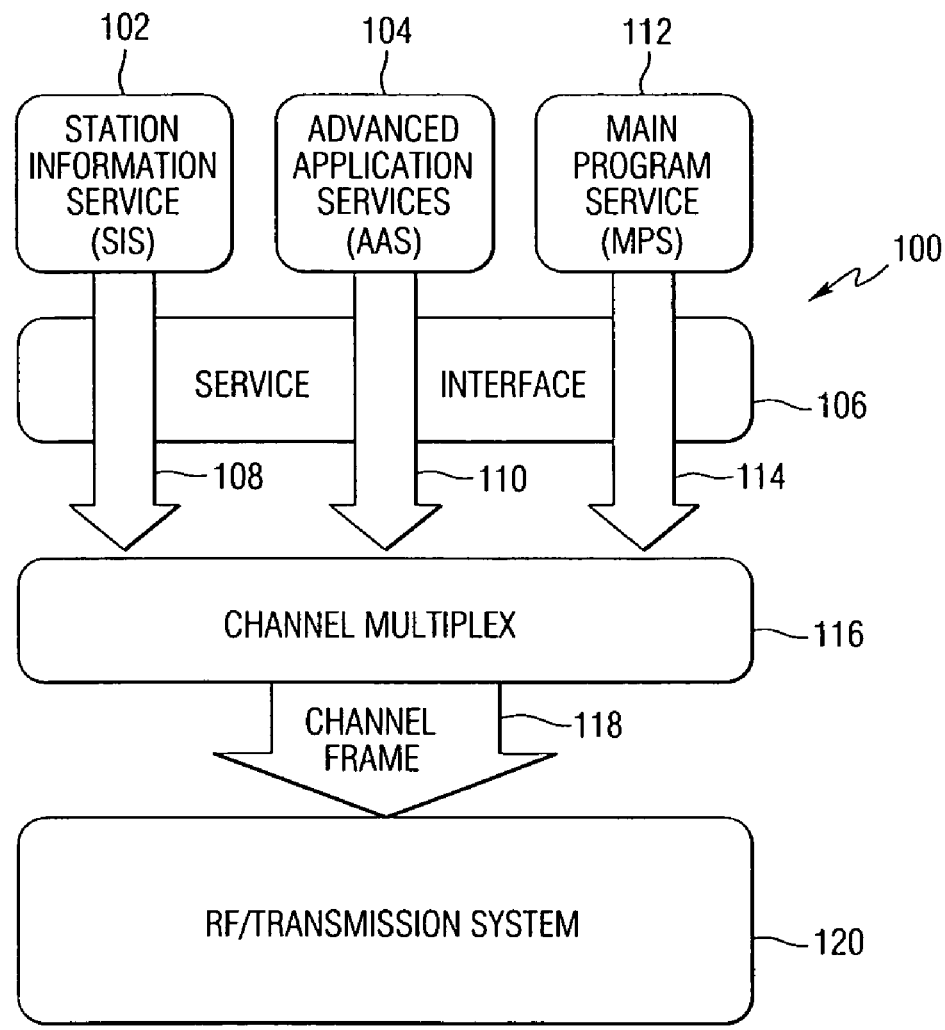
FIG. 5 is functional block diagram of the signal processing protocol layers of a transmitter for use in a digital audio broadcasting system.

FIG. 5 is a functional block diagram of the signal processing protocol layers 100 of a transmitter for use in a digital audio broadcasting system. FIG. 5 illustrates how control and information signals are passed through the various layers of the protocol stack to generate an IBOC signal on the broadcast side.

The system can be used to provide various services including a Station Identification Service (SIS) and an Auxiliary Application Service (AAS), as illustrated by blocks 102 and 104.

The SIS provides the necessary control and identification information that indirectly accommodates user search and selection of digital radio stations, and their supporting services. The SIS receives inputs from all other applications so that their status can be broadcast over the Primary IBOC Data Service Logical Channel (PIDS) and/or Secondary IBOC Data Service (SIDS) L1 logical channels. The AAS allows a virtually unlimited number of custom and specialized digital applications to operate concurrently. Auxiliary applications can be added at any time in the future.

A data service interface 106 receives SIS and AAS signals as illustrated by arrows 108 and 110. A main program application 112 also supplies a main program service (MPS) data signal to interface 106 as shown by arrow 114. The data service interface outputs data to a channel multiplexer 116, which produces transfer frames as illustrated by arrow 118 for use by the RF/transmission system 120, also referred to as Layer 1 (L1) of the protocol stack.

The AM and FM systems share a common system protocol stack, but differ primarily in the Layer 1 (L1) physical design. The upper layers are common to both the AM and FM systems.

The Main Program Service preserves the existing analog radio-programming formats in both the analog and digital transmissions. In addition, the Main Program Service can include digital data that directly correlates with the audio programming.

A control system manages the transfer and processing of the data streams from the application encoders. The following description shows how information and data flow within the protocol stack from the perspective of both broadcast and receiver applications.

Protocol stack services are accessed via service access points (SAP). The information exchanged at the SAP is referred to as a service data unit or SDU. The SAP is a point of convergence, defined by the servicing layer, where SDUs are exchanged between the broadcast service provider and users.

A Protocol Data Unit (PDU) is exchanged between peer layers (e.g., from layer n of the transmit side to layer n of the receive side). SDUs for a peer layer are not necessarily identical. However, both transmitted and received SDUs, for the same layer, must preserve the PDU portion that is contained within the SDU.

As shown in FIG. 5, a fundamental purpose of any layer n of the protocol stack, is to deliver PDUs provided by layer n+1 of the transmitter to a peer layer n+1 on the receiver system. The layer n+1 PDU payload consists of layer n+1 protocol control information (PCI) and the upper layer (layer n+2) PDU.

To further understand this concept, consider the flow of information from a layer n+1 to a layer n on the transmit side. Layer n+1 PDUs must be packaged as specified by the layer n service. That package is called a service data unit, or SDU. A layer n SDU includes the layer n+1 PDU plus the layer n SDU control information (SCI). Layer n+1 creates the layer n SDU and sends it to layer n via the layer n service access point.

When layer n receives the SDU, it takes the layer n+1 PDU and its own protocol control information (PCI), which may include information received in the SCI, and creates a layer n PDU. The layer n PDU is then sent to the peer layer on the receiving system, where the process is essentially reversed as information goes up the protocol layers. Hence, each layer extracts the peer PDU and forwards the remaining information to the next layer in the form of an SDU.

Figure 6:
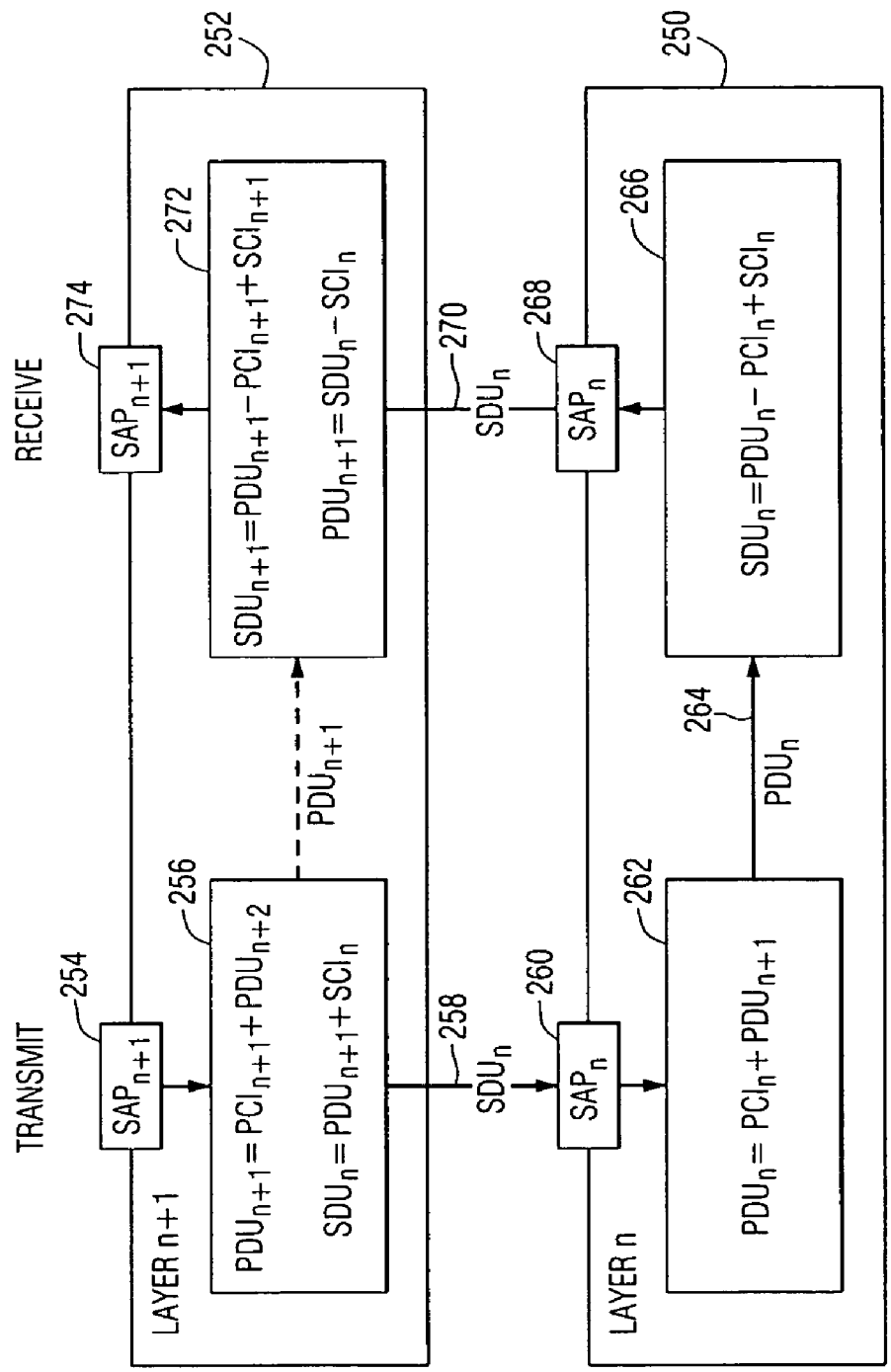
FIG. 6 is a functional block diagram that illustrates the relationship between protocol layers for both transmit and receive systems.

In FIG. 6, a signal entering transmitter service access point 254 is processed as illustrated in block 256 to produce a Layer n+1 service data unit on line 258. The Layer n+1 service data unit is received at Layer n service access point 260 and further processed as illustrated by block 262 to form Layer n protocol data units as illustrated by line 264. The transmitter Layer n protocol data units are transmitted to the receiver and processed as shown in block 266 to form receiver Layer n service data units that are received by receiver Layer n service access point 268 and delivered to the receiver Layer n+1 protocol layer as illustrated by line 270. That receiver Layer n+1 protocol layer processes the receiver Layer n service data units as shown by block 272 and sends the resulting receiver Layer n+1 service data unit signals to a service access point 274.

Figure 7:
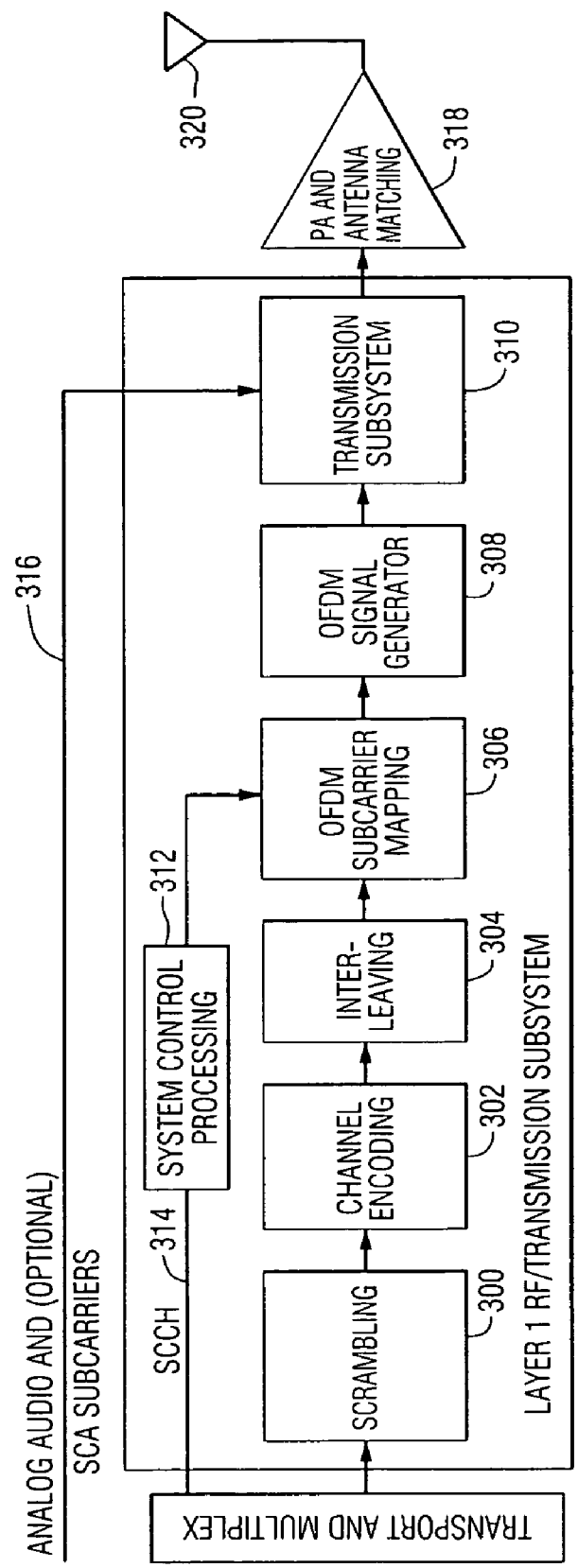
FIG. 7 is a functional block diagram of a transmitter for use in a DAB system.

FIG. 7 is a functional block diagram of a portion of a transmitter showing components that perform the Layer 1 signal processing, including a scrambler 300, a channel encoder 302, an interleaver 304, OFDM mapping 306, OFDM signal generating 308, a transmission subsystem 310, and a system control processor 312. The transmitter system control processor 312 receives a system control signal on line 314. The analog audio signal and SCA carriers are delivered to the transmission subsystem, on line 316. The output signal from the RF Transmission Subsystem is then amplified by amplifier and matching circuit 318 and sent to an antenna 320 for broadcast.

Figure 8:
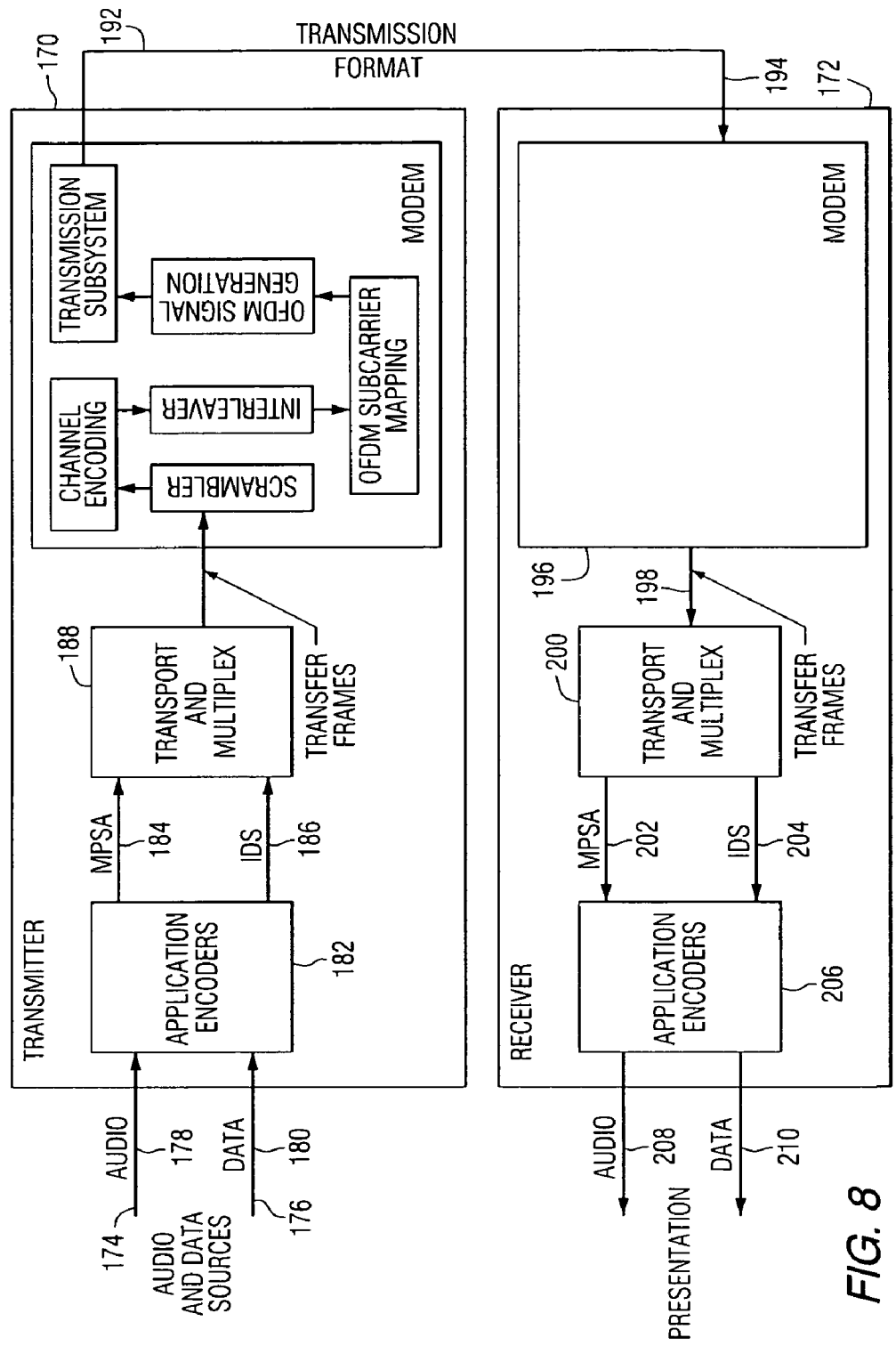
FIG. 8 is a functional block diagram of a DAB system including a transmitter and a receiver.

FIG. 8 is a functional block diagram of a DAB system including a transmitter 170 and a receiver 172. The transmitter includes inputs 174 and 176 for receiving audio and data signals on lines 178 and 180. Application encoders 182 convert the audio and data signals into main program service audio (MPSA) signals on line 184, and integrated data service signals on line 186. These signals are processed by a transport and multiplex subsystem 188. A modem 190 converts the transfer frames to output frames on line 192 which can be amplified and broadcast from antenna 193 using, for example, one of the waveforms set forth in FIGS. 2, 3 or 4.

The receiver 172 can include an antenna 194 and conventional front end circuits 195 that receive the transmitted signal and produce the received modem frames on line 196. The modem 197 converts the received modem frames into transfer frames in the form of packets on line 198. A transport and de-multiplexer 200, including a channel demultiplexer and an integrated data service transport converts the transfer frames into a main program service audio signal on line 202 and an integrated data service signal on line 204. Application decoders 206 convert these signals to audio and data output signals on line 208 and 210.

Figure 9:
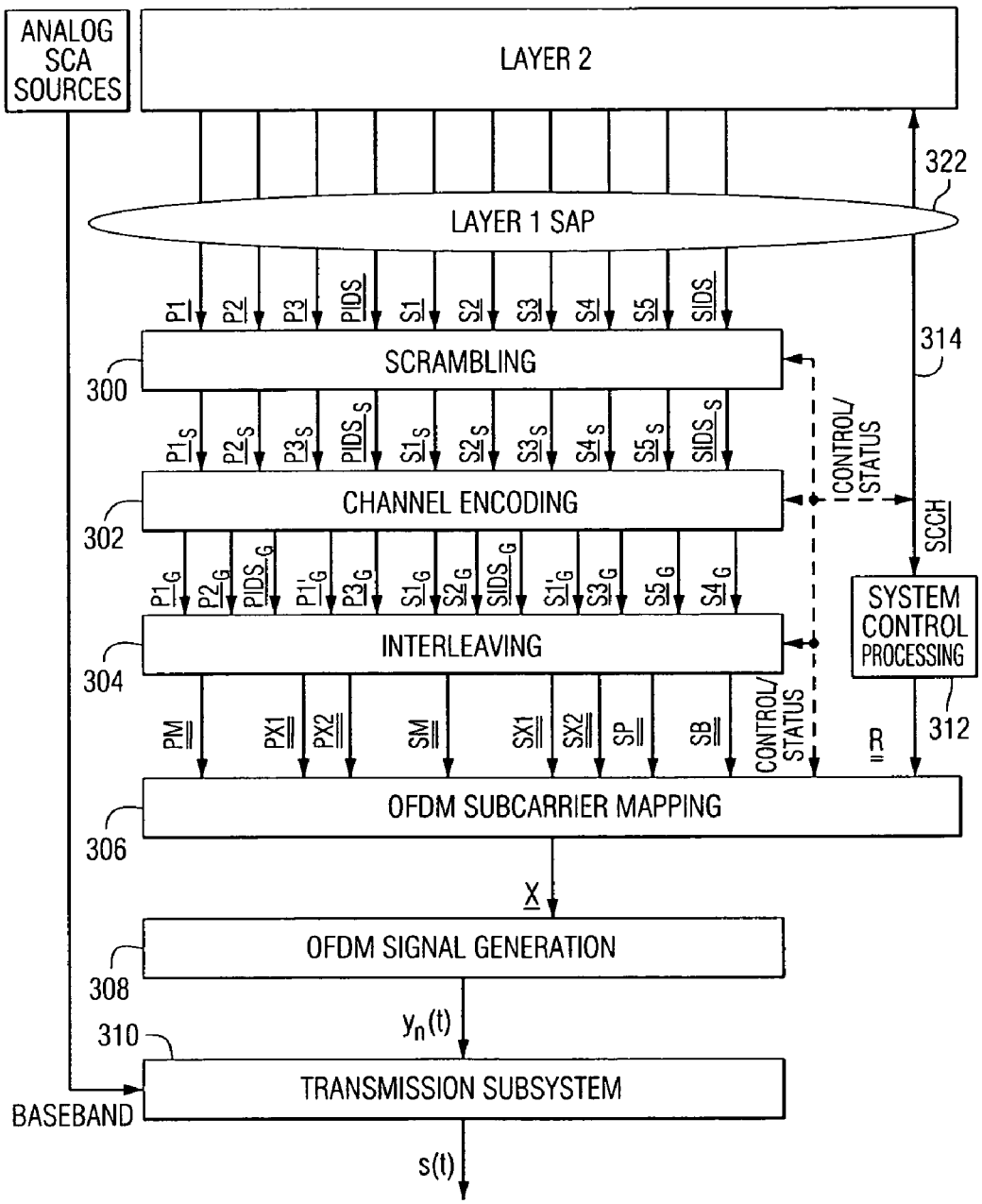
FIG. 9 is functional block diagram of the modem/physical layer of a DAB transmitter.

FIG. 9 is a functional block diagram of modem/physical Layer 1 processing for a transmitter. Audio and data are passed from the higher protocol layers to the physical layer (Layer 1), which defines the functions of a modem, through a plurality of Layer 1 service access point (SAP) 322.

The L1 SAP defines the interface between Layer 2 and Layer 1 of the system protocol stack. Layer 2 provides a plurality of logical channels, designated as P1 through P3, PIDS, S1 through S5, and SIDS. The transmitter can be operated in a variety of service modes. Each channel enters Layer 1 in discrete transfer frames, with a unique size and rate determined by the service mode. Transfer frames that carry information from Layer 2 are referred to as L1 SDUs.

The concept of logical channels and their function is central to the transport and transmission of data through the IBOC system. A logical channel is a signal path that conducts Layer 1 SDUs through Layer 1 with a specified grade of service. The underscore on the logical channel designations indicates that the data in the logical channel is formatted as a vector.

Scrambling randomizes the digital data in each logical channel to "whiten" and mitigate signal periodicities when the waveform is demodulated in a conventional analog FM demodulator. The bits in each logical channel are scrambled to randomize the time-domain data and aid in receiver synchronization. The inputs to the scramblers are the active logical channels from the L1 SAP, as selected by the service mode. The outputs of the scramblers are transfer frames of scrambled bits for each of the active logical channels. The scrambler generates a pseudorandom code which is modulo-2 summed with the input data vectors. The code generator is a linear feedback shift register.

Figure 10:
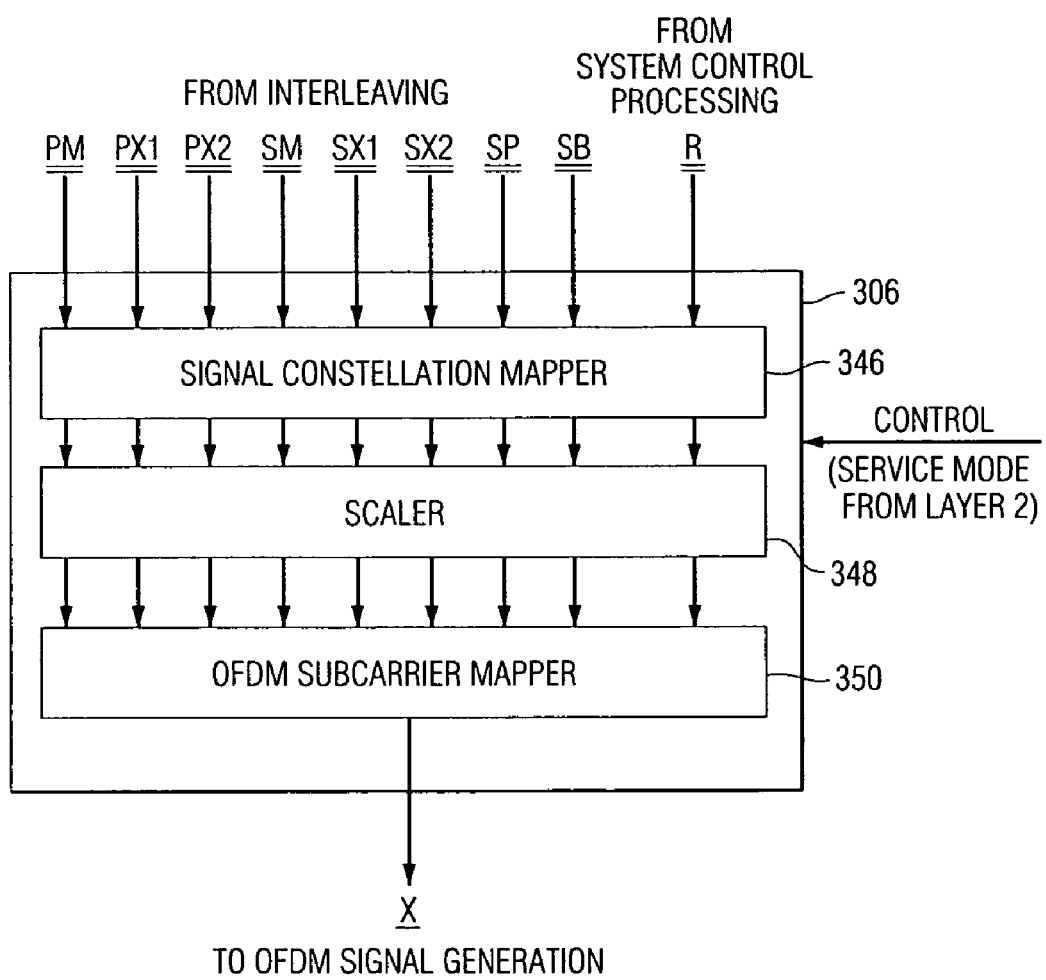
FIG. 10 is a functional block diagram of a signal constellation mapper.

Channel coding comprises the functions of scrambling, channel encoding, and interleaving shown in FIG. 10. Each logical channel is scrambled and encoded separately and in parallel. All parallel scramblers are identical, but operate at different rates, depending on the active service mode. Each scrambler generates a maximal-length scrambling sequence using a linear feedback shift register with primitive polynomial. A given bit of a scrambled transfer frame is generated by modulo-2 adding the associated input bit with the corresponding bit of the scrambling sequence.

FIG. 10 is a functional block diagram of the signal constellation mapping 306. A signal constellation mapper 346 receives signals from a plurality of interleavers and produces signals that are scaled by scaler 348 and mapped to OFDM subcarriers by OFDM subcarrier mapper 350. Interleaving is applied to the logical channels in the RF/Transmission subsystem. Interleaving comprises six parallel interleaving processes (IPs) designated as: PM, PX, SM, SX, SP, and SB. An IP can contain one or more interleavers, and, in some cases, a transfer frame multiplexer. The service mode determines which inputs and IPs are active at any given time. In addition, for those service modes where the P3 logical channel is active, a P3IS control bit obtained from layer L2 determines whether a long or short interleaver is employed. The universe of inputs for interleaving are the channel-encoded transfer frames from the primary logical channels P1 through P3 and PIDS, and the secondary logical channels S1 through S5 and SIDS. The interleaver outputs are matrices.

In service modes MP2-MP5 and MP7, the P3 logical channel may utilize either a short or a long interleaver depth (time span). The long interleaver depth is more robust than the short interleaver depth. However, the long interleaver (about 1.48 seconds) results in a long decode time which affects receiver tuning time before audio can be heard. This long tuning time is unacceptable in some cases, so a short interleaver is used.

Long or short interleavers are relative terms with regard to the PDU length. A short interleaver encapsulates an amount of bits of a single PDU, while a long interleaver can encapsulate bits from several consecutive PDUs. The length of the long interleaver is a parameter. There is a tradeoff between robustness and content availability delay. If delay is considered, at a given time by a specific user for a specific case, to be the more important factor, then a short interleaver may be selected, resulting in limited robustness. If robustness is considered, under a given time and content combination, to be the more important factor, then a long interleaver may be selected.

As shown in FIG. 9, the system control channel (SCCH) bypasses the channel coding. Under the direction of the upper layers, System Control Processing assembles and differentially encodes a sequence of bits (system control data sequence) destined for each reference subcarrier. In one example, there are up to 61 reference subcarriers, numbered 0 . . . 60, distributed throughout the OFDM spectrum. The number of reference subcarriers broadcast in a given waveform depends on the service mode. However, in this example, System Control Processing always outputs all 61 system control data sequences, regardless of service mode.

OFDM Subcarrier Mapping assigns interleaver partitions to frequency partitions. For each active interleaver matrix, OFDM Subcarrier Mapping assigns a row of bits from each interleaver partition to its respective frequency partition in a complex output vector X. In addition, system control data sequence bits from a row of matrix R, the matrix of system control data sequences, are mapped to the active reference subcarrier locations in X. The service mode dictates which interleaver matrices and which elements of R are active. FIG. 10 shows the inputs, output, and component functions of OFDM Subcarrier Mapping.

The inputs to OFDM Subcarrier Mapping for each symbol are a row of bits from each active interleaver matrix and a row of bits from R, the matrix of system control data sequences. The output from OFDM Subcarrier Mapping for each OFDM symbol can be a single complex vector, X, of length 1093.

The interleaver matrices carrying the user audio and data (PM, PX1, . . . SB) are mapped to QPSK constellation points and to specific subcarriers. The R matrix is mapped to BPSK constellation points and the reference subcarriers. These phasors are then scaled in amplitude and mapped to their assigned OFDM subcarriers. This process results in a vector, X, of phasors which are output to the OFDM signal generation function.

OFDM Signal Generation receives complex, frequency-domain OFDM symbols from OFDM Subcarrier Mapping, and outputs time-domain pulses representing the digital portion of the FM IBOC signal.

The input to OFDM Signal Generation for the $n^{th}$ symbol is a complex vector $X_n$ of length L, representing the complex constellation values for each OFDM subcarrier in OFDM symbol n. For notational convenience, the output of OFDM Subcarrier Mapping described above did not use the subscript n. Rather, it referred to the vector X as representing a single OFDM symbol. In the following description, the subscript is appended to X because of the significance of n to OFDM Signal Generation. The OFDM symbol is transformed to the time domain by a discreet Fourier transform and shaped to create one time domain symbol, $y_n(t)$. The output of OFDM Signal Generation is a complex, baseband, time-domain pulse $y_n(t)$, representing the digital portion of the FM IBOC signal for OFDM symbol n.

Figure 11:
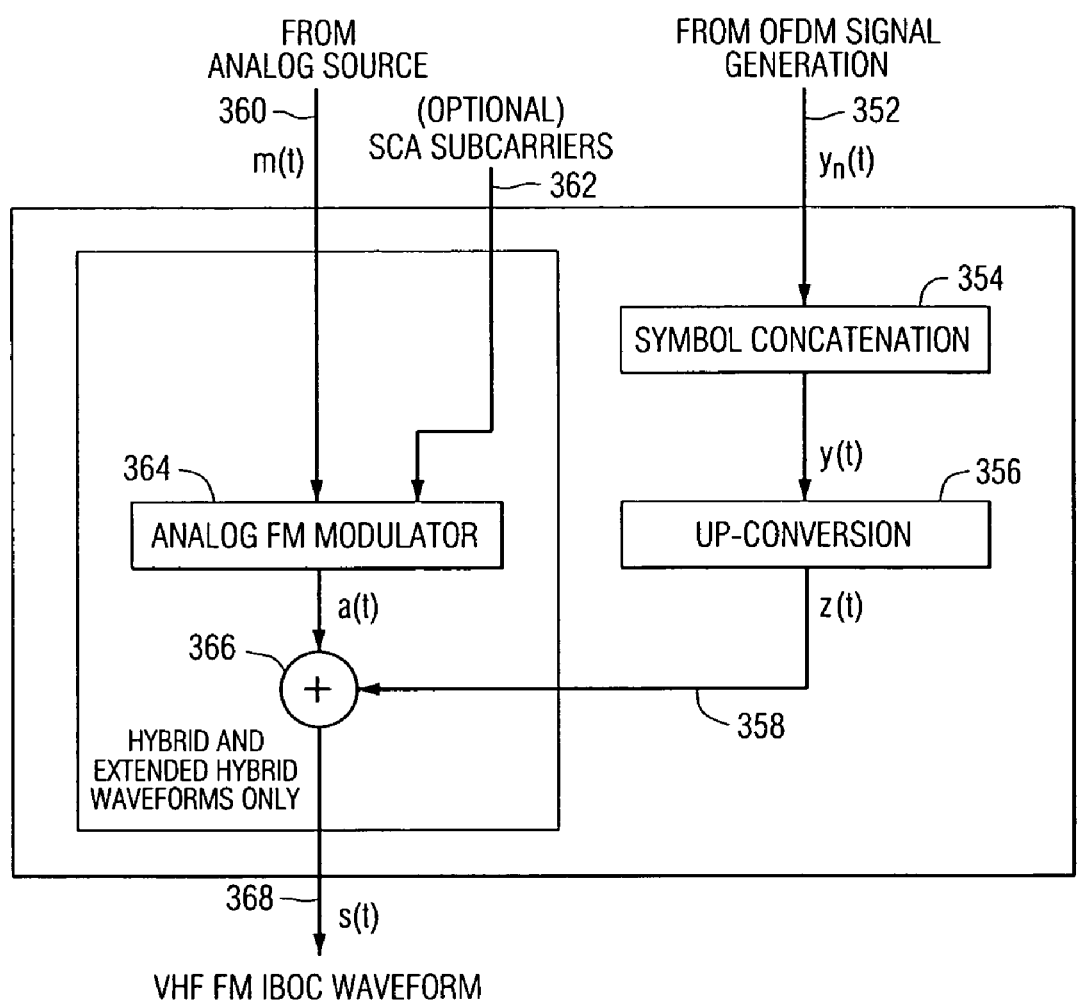
FIG. 11 is a functional block diagram of a DAB modulator.

The $y_n(t)$ pulses are concatenated to form a continuous time domain waveform. This waveform is upconverted and combined with the analog modulated audio (in the hybrid and extended hybrid modes) to create the complete IBOC RF waveform for transmission. This is illustrated in FIG. 11. FIG. 11 is a functional block diagram of a DAB modulator. The plurality of OFDM signals are supplied on line 352 and are subjected to concatenation as shown in block 354. The concatenated signals are upconverted as shown in block 356 to produce the plurality of digitally modulated subcarriers on line 358. The analog program signal is supplied on line 360 and optional SCA subcarriers can be supplied on line 362. The analog program signal and the optional SCA subcarriers are modulated by the analog FM modulator 364. The modulated analog carrier, and SCA if present, and the digitally modulated subcarriers are combined in combiner 366 to produce the DAB waveform on line 368.

There are several issues of time alignment that the transmission system must address. For facilities so equipped, every L1 frame transmitted must be properly aligned with Global Positioning System (GPS) time. Also, the various logical channels must be properly aligned with each other and in some service modes some channels are purposely delayed by a fixed amount to accommodate diversity combining at the receiver. Layer 1 provides for the time alignment of the transfer frames received from Layer 2. The higher protocol layers provide alignment of the contents of the transfer frames.

Figure 12:
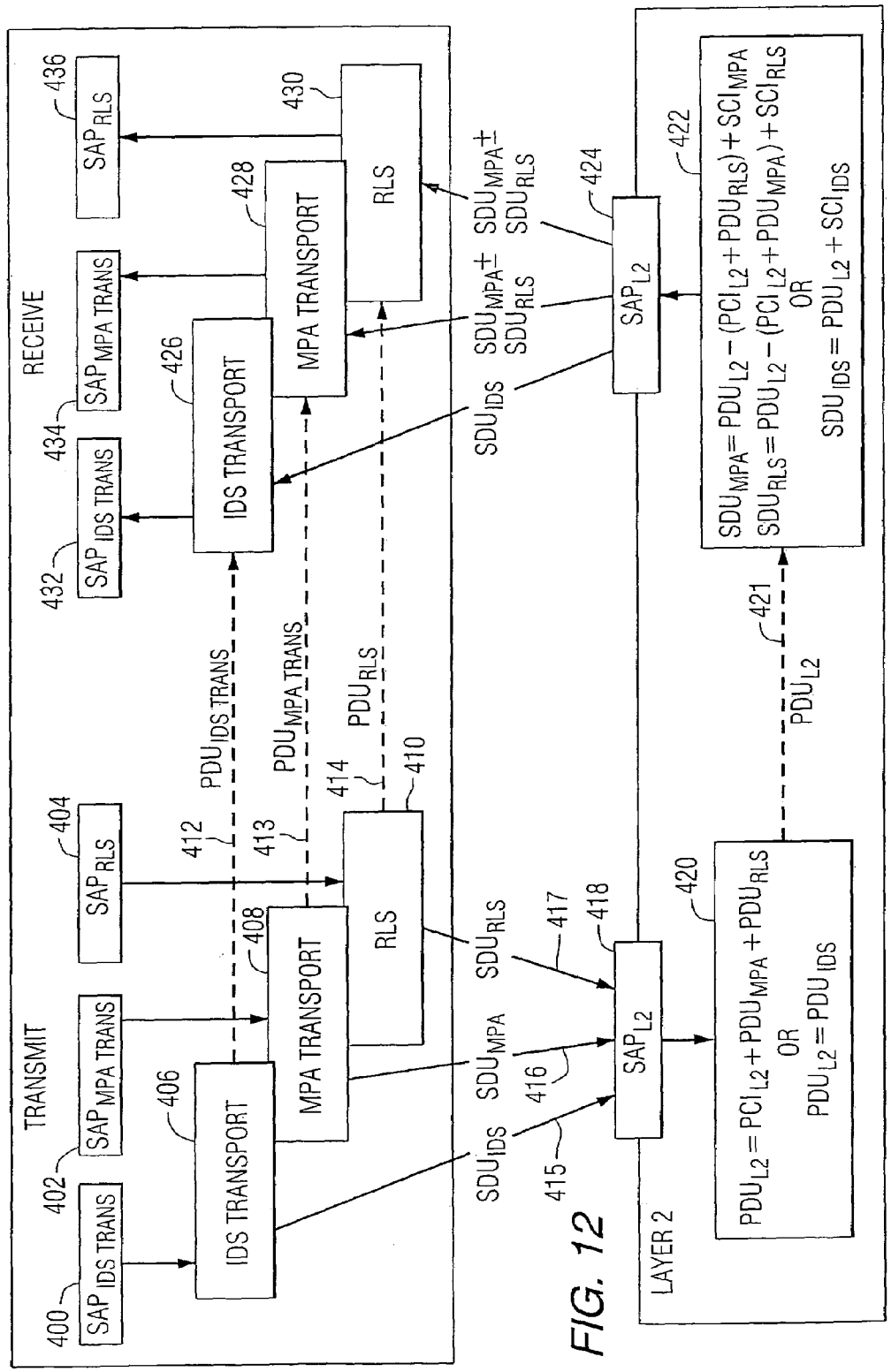
FIG. 12 is a functional block diagram that illustrates the relationship between protocol layers for both transmit and receive systems.

The primary service provided by Layer 2 (L2), enables the system to support three independent transport services as shown in FIG. 12:

1. Main Program Service Audio Transport
2. Radio Link Service Transport
3. IDS Transport Unused flags have been included to allow for additional transports in the future.

FIG. 12 is a functional block diagram that illustrates the relationship between protocol Layer 2 and higher protocol layers for both the transmit and receive systems. Service access points 400, 402 and 404 in the transmitter receive IBOC data service, main program and radio link signals. The signals are processed as illustrated in IDS transport block 406, MPA transport block 408 and RLS block 410 to produce IDS, MPA and RLS PDU's as illustrated by lines 412, 413 and 414. The transport functions also produce IDS, MPA and RLS SDU's, on lines 415, 416 and 417, which are delivered to service access point 418 of transmitter Layer 2. The transmitter Layer 2 processes these signals as illustrated in block 0420 to produce Layer 2 PDU's, as illustrated by line 421, which are transmitted to Layer 2 of the receiver and processed as shown in block 422 to produce SDU's that are sent to the higher protocol layers of the receiver through service access point 424. IDS, MPA and RLS transport functions 426, 428 and 430 in the higher layers of the receiver further process the signals to produce output signals at service data points 432, 434 and 436.

A special transport/data link can be used for transmitting SIS data on PIDS and SIDS Layer 1 logical channels. For these logical channels, Layer 2 does not perform a multiplexing function, but rather just passes the transport PDUs directly into the Layer 1 PIDS or SIDS logical channel. The IDS transport PDU is the only PDU contained within the PIDS or SIDS Layer 1 logical channel. The PIDS and SIDS channels are not multiplexed because SIS information must be transmitted in a known channel. This implies that the PIDS will not contain other types of transport information. In addition, the PIDS is too small to warrant the header bits required to allow for multiplexing.

Layer 2 allows these transports to be active within any active Layer 1 logical channel (with the exception of PIDS and SIDS). The structure of the Layer 2 allows a transport that serves the multiplexing needs.

An L2 PDU is equivalent to a Layer 1 (L1) PDU or transfer frame. Layer 1 does not provide additional formatting or PCI information within its L1 PDU before it performs physical modem processing of the input L2 PDU. Within Layer 1, all PCI information added by Layer 1 (designated as the system control data sequence) can be included in an independent channel dedicated to L1 PCI (the reference subcarriers) and would not require bandwidth from the Layer 1 payload. PCI information and synchronization information are combined into one reference channel.

The system is extremely flexible and supports various configurations with respect to Layer 1. Based on the Layer 1 service mode, the system provides multiple Layer 1 logical channels. The number of active Layer 1 logical channels and the characteristics defining them vary for each service mode. The defining characteristics of each Layer 1 logical channel are:

Transfer Frame size
Transfer Frame rate
Robustness
Latency

With respect to the exchange between Layer 2 and Layer 1 (RLS and MPA Transport), Layer 2 is a slave to the Layer 1 service mode and configuration. The L2 PDU size and L2 PDU exchange rate are controlled by Layer 1. The total PDU size Layer 2 delivers to the RLS and NPA PDU transports on the receive side is the Layer 1 frame size minus the L2 PCI overhead.

FIG. 12 illustrates Layer 2 processing from both transmit and receive perspectives. On the transmit side, Layer 2 requires the following operational parameters for each active Layer 1 logical channel (with the exception of PIDS and SIDS):

A flag that indicates that each L2 PDU contains a Main Program Audio (MPA) Transport PDU
A maximum size allocated for MPA transport PDU
A flag that indicates that each L2 PDU contains Fixed RLS PDU(s)
A maximum size allocated for RLS PDU(s)

For each active Layer 1 logical channel, Layer 1 indicates to Layer 2 that it requires an L2 PDU. Based on the parameters defined above, L2 signals the MPA transport and/or the RLS to provide their respective PDU's (MPA Transport PDU, Fixed RLS PDU data) that are to be transmitted within the L2 PDU for that specific Layer 1 logical channel.

When Layer 2 receives the NPA transport PDU, it determines if there is opportunistic bandwidth available. Opportunistic data is defined as the unused capacity of a Layer 1 channel in which a fixed allocation of bytes has been assigned to the MPA encoder but not fully utilized. This capacity is time-varying and is available for data transport. If so, Layer 2 indicates this to the RLS and the RLS provides an opportunistic RLS PDU to be included in the Layer 2 PDU.

Once Layer 2 has received PDUs from the MPA transport and/or RLS, it creates the Layer 2 PDU to be sent to the appropriate Layer 1 logical channel by:

1. Creating Layer 2 PCI flags based on content and encoding
2. Spreading Layer 2 PCI flags across L2 PDU
3. Inserting MPA and RLS PDUs into Layer 2 PDU around the spread PCI For a PIDS or SIDS Layer 1 logical channel, Layer 1 indicates to Layer 2 that it requires a L2 PDU. Layer 2 indicates to the IDS Transport to provide its respective PDU. Layer 2 forwards the PIDS PDU directly to Layer 1.

The receiver does not rely on operational parameters. Rather, it must adapt to the configuration being broadcast on the station/channel it is tuned to.

The L2 PDU structure is such that once the PCI information has been extracted, the entire L2 PDU (possibly containing a combination of MPA Transport PDU, Opportunistic RLS PDU, and Fixed RLS PDU) can be routed in its entirety to either the MPA Transport or RLS Transports. Based on the L2 PDU structure, these transports can process their specific PDUs and discard PDUs that do not relate to them. This provides an extra level of robustness for a receiver implementation and it is recommended that receiver designs make use of this property to provide a higher level of robustness. The system allows for various configurations in which L1 channels (available at the receiver) are present or not present based on station configuration. This uniqueness of Layer 1 leads to specific methods applied at L2 to efficiently identify the transport data that is contained in an L1 channel.

Figures 13, 14:
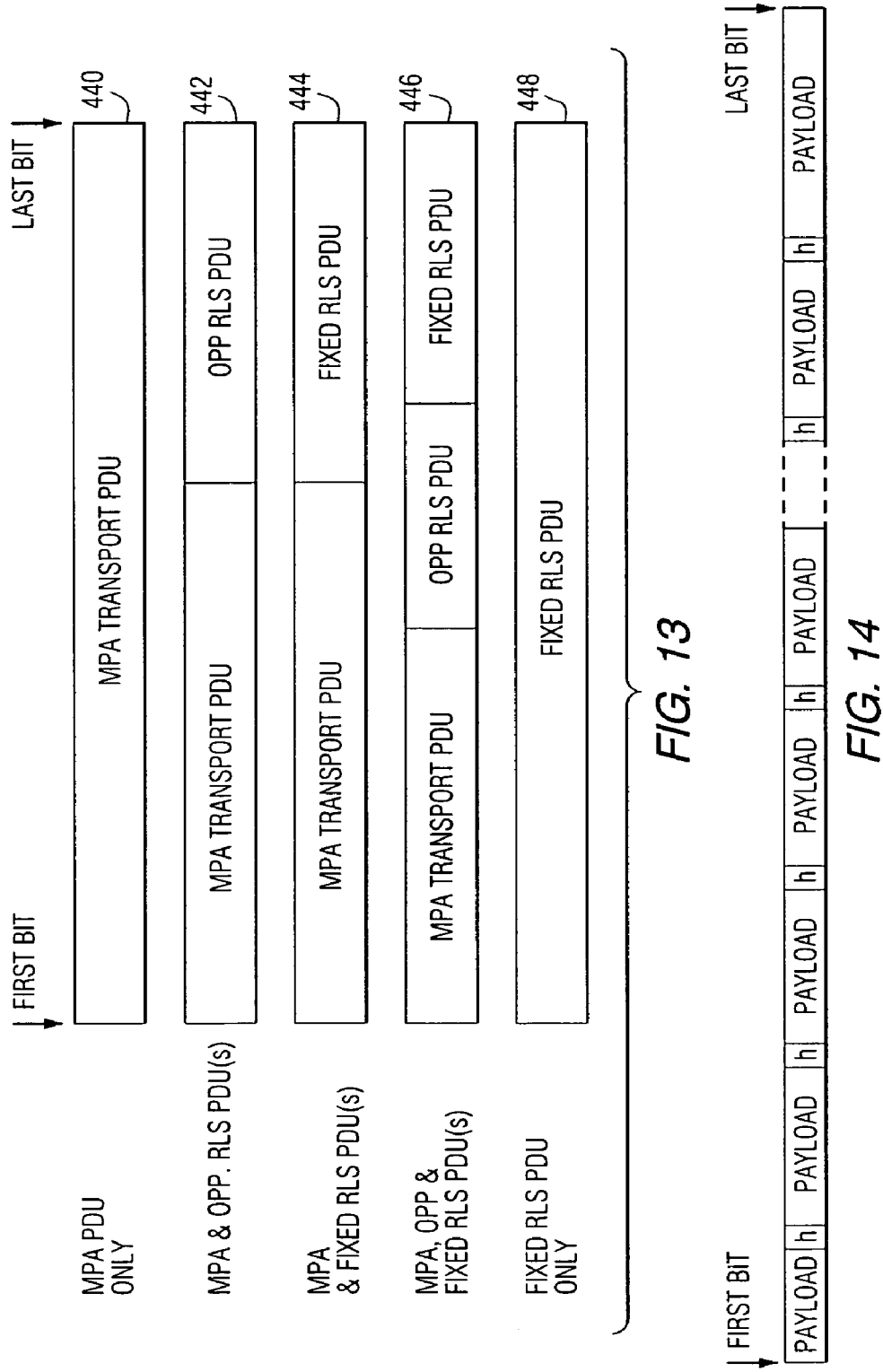
FIG. 13 is a schematic representation of various transport frames used in the DAB system.
FIG. 14 is a schematic representation of a frame of data used in a DAB system.

Refer to FIG. 13 for an overview of the various L2 PDU structures. The structure can be different for each transfer frame and for each L1 logical channel.

A receiver receives an L2 PDU from L1 for each active logical channel, and extracts and decodes the L2 PCI Bits. Based on the L2 PCI, the receiver can route the entire L2 PDU to the appropriate destination, i.e. MPA Transport and or RLS (fixed and opportunistic).

For the PIDS (SIDS) logical channel the receiver can route the received L2 PDU to the IDS Transport.

The system provides SIS to all applications and services. The PIDS and SIDS logical channels are dedicated to transporting SIS information that must be acquired quickly for scanning applications. As mentioned previously there is a specialized IDS transport that creates the PIDS/SIDS PDU for a PIDS/SIDS Layer 1 logical channel. On the transmit side, Layer 2 routes the PIDS and SIDS PDUs to Layer 1 directly. Similarly on the receive side Layer 2 routes the PIDS and SIDS PDUs to the IDS transport.

An optimized robust header (PCI) is deployed in each of the various logical channels of the FM system (including the secondary logical channels) and the AM system. The PCI indicates the content of the payload. The header provides one of the following five indications corresponding to the PDU structures:

The payload is audio oriented (MPA Transport PDU)

The payload is data oriented (RLS Transport)

A mixed content payload, containing MPA transport and opportunistic RLS transport PDUs A mixed content payload, containing MPA transport and fixed RLS transport PDUs A mixed content payload, containing MPA transport, opportunistic RLS transport, and fixed RLS PDUs FIG. 13 schematically illustrates the five types of headers 440, 442, 444, 446 and 448. When the L2 PDU content is audio-oriented (MPA Transport), opportunistic data can still be inserted into the payload (Opp RLS), and additional signaling is provided by RLS such that the boundaries of the Opportunistic RLS PDU can be found and processed by the RLS. However, as mentioned previously, the entire payload is associated with the main program audio (MPA Transport) and is handled as such, due to signaling contained within the audio payload. Such signaling enables the audio processing (NPA Transport) and RLS processing to use the payload properly.

When the payload (L2 PDU) contains a Fixed RLS PDU, an extended header 444 is deployed within the RLS. The mixed content PDU requires additional indications. A delimiter is provided by RLS, indicating the payload parts associated with each type of service.

The signaling is per transfer frame (PDU) and does not require any knowledge of previous or future transfer frames.

A generic transfer frame, as shown in FIG. 14, includes the payload and the header PCI. The payload header in one example consists of 24 bits, spread over the transfer frame.

The header includes one of eight cyclic permutations, $CW_0$ through $CW_7$, of a 24 bit sequence. The header sequences and the corresponding indication type are described in Table 1. L2 on the transmit side selects the appropriate sequence, based on the SCI obtained from the layers above. The contents of a selected CW are designated as $[h_0, h_1, \ldots, h_{22}, h_{23}]$.

TABLE 1

Generic Header Sequence Indications

| Sequence | Binary Header Sequence | Hexadecimal Equivalent | MPA Transport PDU | Fixed RLS PDU | Opp. RLS PDU |
|---|---|---|---|---|---|
| $CW_0$ | [110010110001101100011100] | 0xCB1B1C | Yes | No | No |
| $CW_1$ | [001011000110110001110011] | 0x2C6C73 | Yes | No | Yes |
| $CW_2$ | [001100101100011011000111] | 0x32C6C7 | Yes | Yes | No |
| $CW_3$ | [110011001011000110110001] | 0xCCB1B1 | Yes | Yes | Yes |
| $CW_4$ | [011100110010110001101100] | 0x732C6C | No | Yes | No |
| $CW_5$ | [101100011100110010110001] | 0xB1CCB1 | Reserved | TBD | TBD |
| $CW_6$ | [000110001100101100011011] | 0x1CCB1B | Reserved | TBD | TBD |
| $CW_7$ | [110001110011001011000110] | 0xC732C6 | Reserved | TBD | TBD |

As shown in FIG. 14, the header bits are preferably evenly spread over most of the transfer frame. The payload is quantified in units of bytes. Any excess payload that does not constitute a byte is located at the end of the payload. The $h_0$ header bit can be offset from the beginning of the transfer frame by $N_{start}$ bytes. Header bit $h_1$ is offset from $h_0$ by $N_{offset}$ bits. Each remaining header bit is separated from the previous header bit by $N_{offset}$ bits. These numbers depend on the L1 PDU length (in bits), L, as shown in Table 2. If the L1 PDU length is an integral number of bytes, the header length is 24 bits. If the L1 PDU length is not an integral number of bytes, the header is shortened to either 23 or 22 bits as shown in Table 2. If the header length is 23 bits, $h_{23}$ is not used. If the header length is 22 bits, $h_{22}$ and $h_{23}$ are not used. The L2 PDU is received after being decoded by a Viterbi decoder at L1. Errors (if they occur) appear in bursts at the output of the decoder. Without spreading, a very small burst of L1 errors, that may corrupt an unspread sequence, may therefore prevent the use of a nearly perfect PDU. Spreading the sequence eliminates the problem. The header is offset to avoid any damage that might occur if the preceding decoding at L1 is not optimal, resulting in errors on the edges of the PDU.

TABLE 2

Header Spread Parameters

| L1 PDU Length, L (Bits) | (L MOD 8) = | $N_{start}$ (Bits) | $N_{offset}$ (Bits) | Header Length (Bits) |
|---|---|---|---|---|
| <72000 | 0 | 120 | INT[(L-Nstart)/24] − 1 | 24 |
| | 7 | 120 | INT[(L-Nstart)/23] − 1 | 23 |
| | 1-6 | 120 | INT[(L-Nstart)/22] − 1 | 22 |
| ≥72000 | 0 | L-30000 | INT[(L-Nstart)/24] − 1 | 24 |
| | 7 | L-30000 | INT[(L-Nstart)/23] − 1 | 23 |
| | 1-6 | L-30000 | INT[(L-Nstart)/22] − 1 | 22 |

The receiver, upon receiving a transfer frame from L1, L2, processes the frame and determines the following, frame content boundaries of extended content, if such boundaries exist frame integrity management handling exceptions Using the spread parameters for a given logical channel in a given L1 service mode, the L2 header bits are collected and put into a continuous 24 (or 22) bit structure, marked as $S_{rcv}$.

A correlation process of the received sequence with each possible expected sequence, can then take place.

The IDS transport PDU is contained within either the PIDS or SIDS L1 channel frame.

Figure 15:
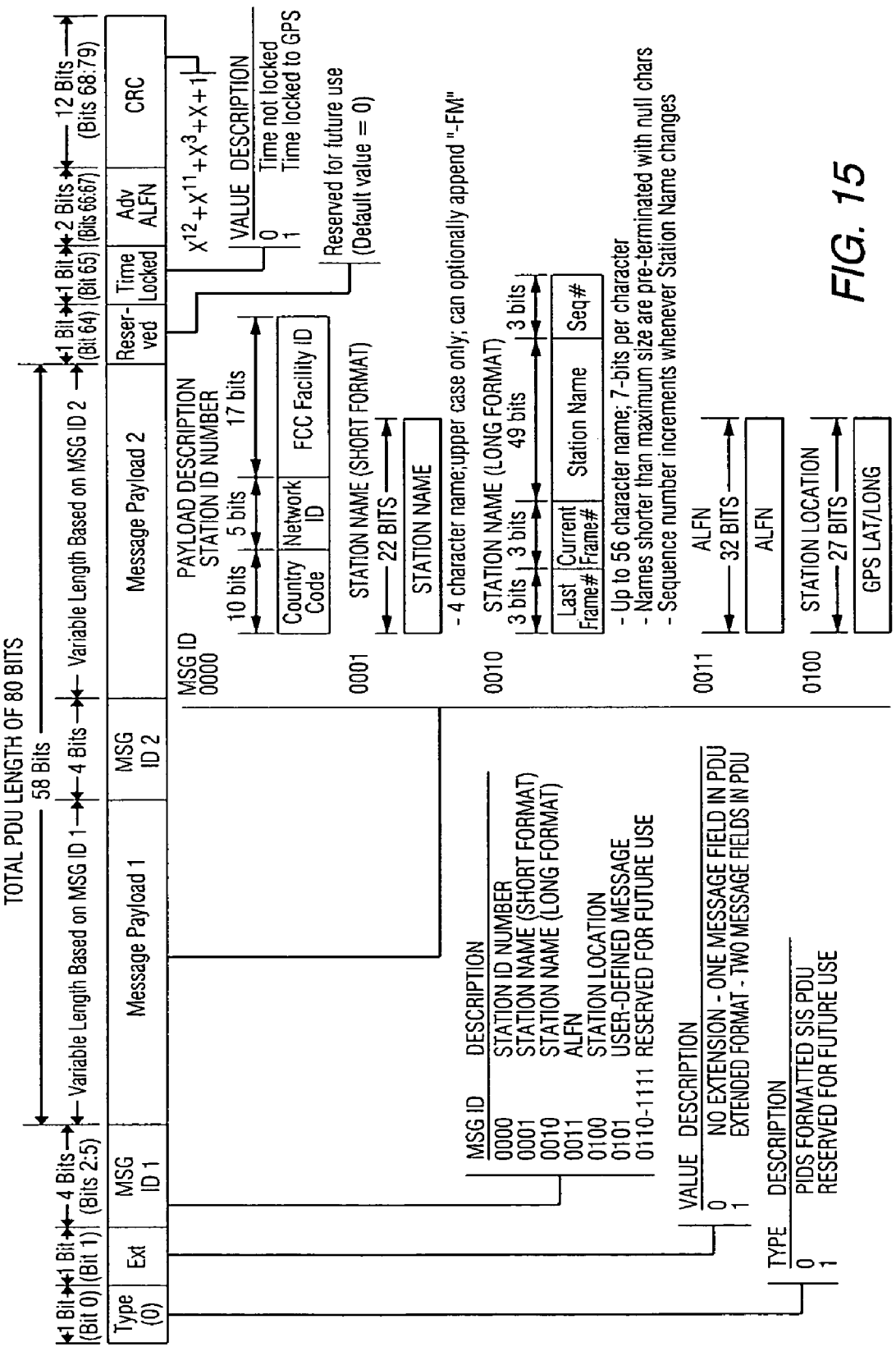
FIG. 15 is another schematic representation of a frame of data used in a DAB system.

The PIDS PDU is 80 bits in length as shown in FIG. 15. The most significant bit of each field is shown on the left. Layer 2 and Layer 1 process bits MSB first—i.e. bit 0 is the first bit interleaved by L1. The PDU contents are defined by several control fields within the PDU. The Type bit is normally set to zero. If this bit is a one, the remainder of the PDU contents may be different. This provides an option for future use. The PDU format attempts to guarantee the ability to broadcast the advanced ALFN, while consuming negligible capacity, yet maintaining robustness.

Type 0 PDUs may contain two independent variable-length short message fields or a single longer message, depending on the state of the Ext bit. If Ext =0, the message 1 field can be up to 58 bits in length and the message contents are determined by the state of the first message ID field, MSG ID 1. Any unused bits at the end of the message payload 1 field are zeroed. If Ext =1, then the message has a length and contents defined by MSG ID 1, and message 2 is active, with length and contents defined by MSG ID 2. In this case, the combined lengths of the two messages must be no greater than 54 bits. Any unused bits at the end of the message payload 2 are zeroed. Two message structures are provided to meet potential broadcaster needs. Some broadcasters may want to send short call letters, while others may want to send long call letters. This system supports both. There is a tradeoff in that the long station names will take longer to be received and displayed to the user at the receiver. Each message serves a different target group and a different set of variables. Short content would use message 1, and long content would use both message 1 and message 2.

The definitions of the MSG ID 1 and MSG ID 2 fields are identical. Any message may be placed in either message 1 or message 2 provided that the total 56-bit available payload length is not violated when combined with a second message. Longer messages must use the single message option (Ext =0).

The station ID Number is uniquely assigned to each broadcasting facility. The station name has both a short and a long format. The short format may be used with the two-message PDU structure so that it may be multiplexed with other messages and thus can be repeated frequently. The long format requires the single message structure and may be extended across multiple PDUs. This format can be used to identify stations by a moderately long text string.

The Absolute Layer 1 Frame Number (MSG ID=0011) contains the 32-bit ALFN. ALFN increments every L1 frame period coincident with the start of L1 block 0. In all AM and FM service modes, the ALFN that is sent corresponds to the actual frame number at the time it is broadcast over the air. If bit 65 of a PDU (regardless of MSG ID 1 or MSG ID 2) is set to one, the ALFN is locked to GPS time.

Figure 16:
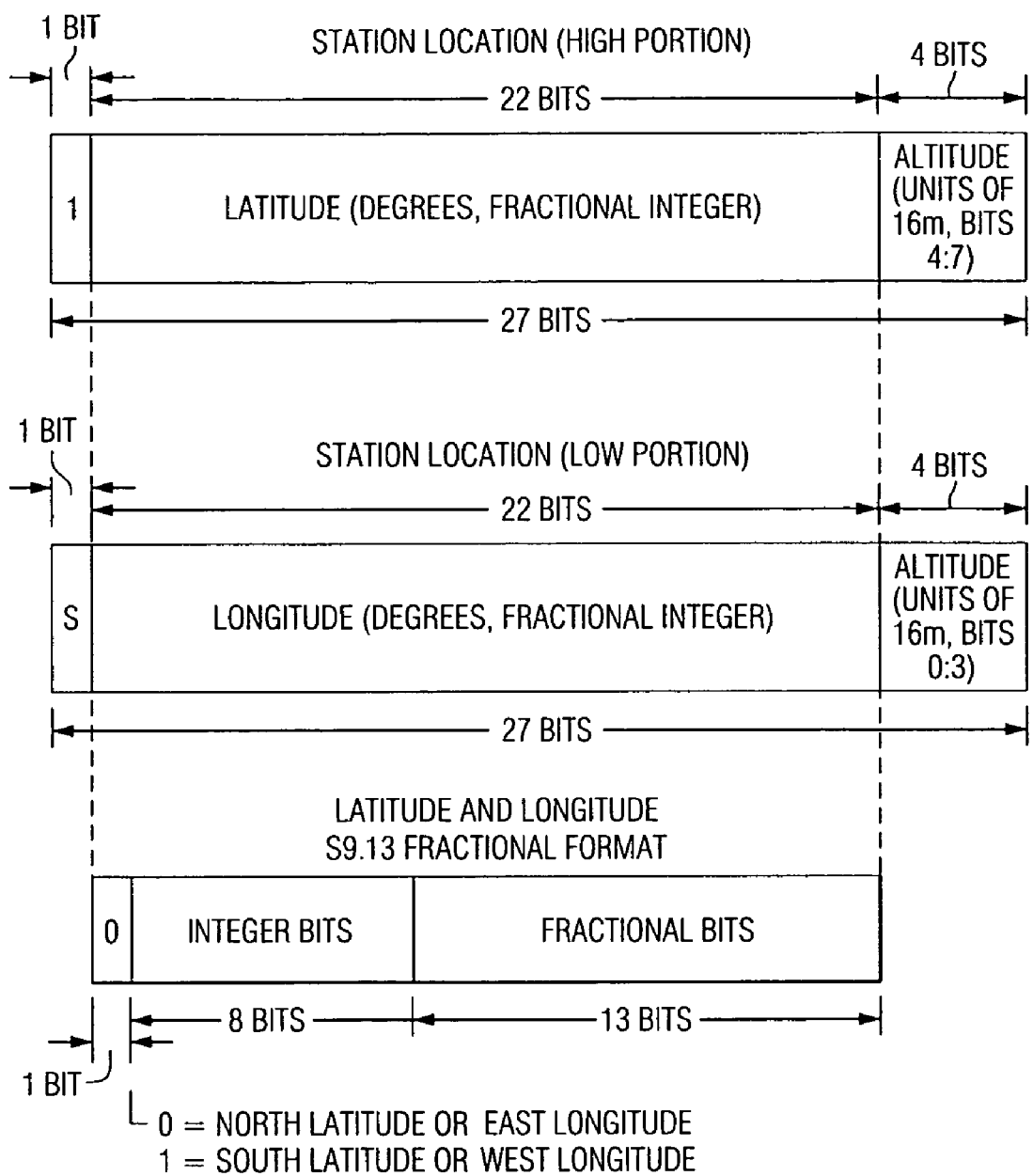
FIG. 16 is a schematic representation of various data words that can be used in a DAB system.
Figure 17:
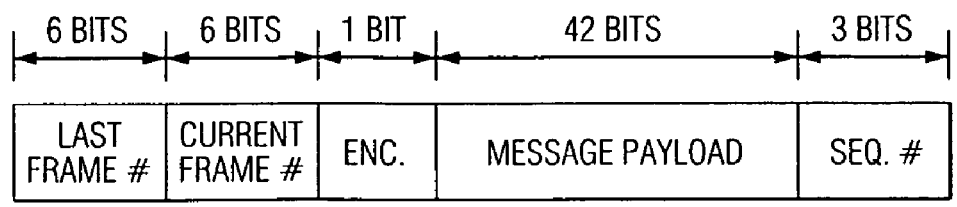
FIG. 17 is a schematic representation of another frame of data used in a DAB system.

The Station Location (MSG ID 0100) field indicates the absolute three-dimensional location of the feedpoint of the broadcast antenna. Such location information may be used by the receiver for position determination. Position information is split into two messages—a high and a low portion. Altitude is in units of (meters×16) (i.e. the LSB is equal to 16 meters). Latitude and longitude are both in the same fractional formats. The LSB is equal to 1/8192 degrees. The MSB is the sign bit, which indicates the hemisphere. Positive longitude values represent positions north of the equator. Positive longitudes are in the eastern hemisphere. Longitude ranges are from −180 to +180, while permissible latitude values are between −90 and +90. Anything outside of these ranges is invalid. FIG. 16 shows the format of the station location information.

Each PDU is terminated with a 12-bit cyclic redundancy check (CRC). The CRC is computed based on all 68 bits of the other fields in the PDU, including unused message payload bits, which are always set to zero.

The PIDS Transport allocates two bits to broadcast the absolute L1 frame number in a serial fashion. The format is different for AM and FM as outlined in the following description. In both cases, the value of ALFN to be transmitted over the PIDS channel is updated coincident with L1 block 0 of each L1 frame.

Figure 18:
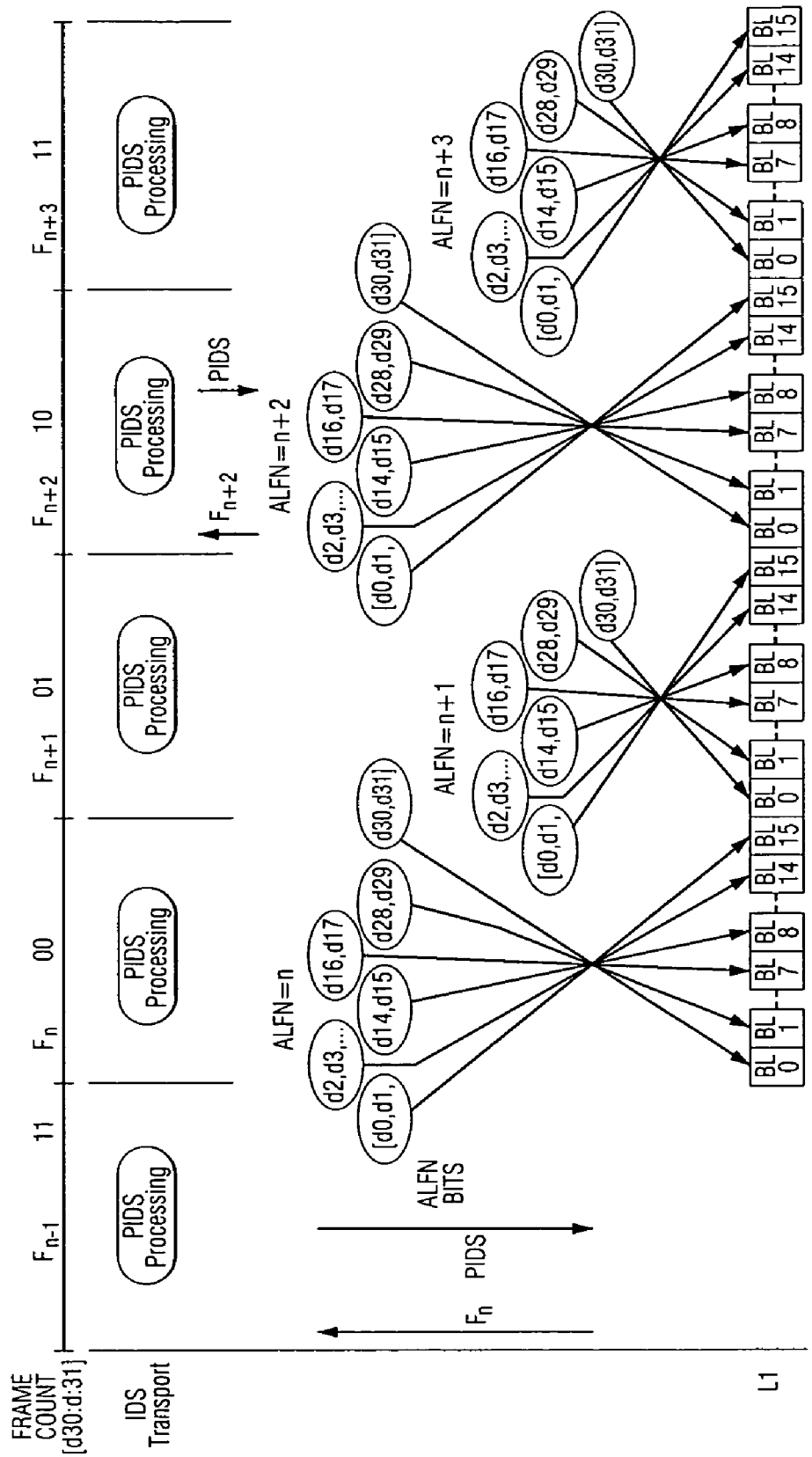
FIG. 18 is a diagram showing the transfer of data to an output data frame.

Referring to FIG. 18 for FM System Processing, the 32 bits are subdivided into two 16-bit groups, one labeled d16 through d31 (16 LSBs) and one labeled d0 through d15 (16 MSBs). ALFN bits d16:31 are further subdivided into pairs and mapped to the two-bit Adv ALFN field of each PIDS block starting with block 0. ALFN bits d30:31 are broadcast at block 0 of each frame, ALFN bits d28:29 are broadcast at block 1 of each frame and ALFN bits d16:17 are broadcast at block 7 of each frame.

The processing sorts and sends, over time, the ALFN bits. The sorting method consumes negligible capacity, but allows the receiver to reliably recover and maintain the station ALFN, even when the PDU is impaired and the cyclic redundancy check (CRC) fails.

ALFN bits d0:15 are further subdivided into pairs and mapped to the Adv ALFN field in blocks 8 through 15 as shown.

Layer 1 of the protocol stack does not handle ALFN directly, in regard to broadcasting the frame number. The frame number is part of the PIDS logical channel, which is handled by L1. In all AM and FM service modes, the relevant portion of the ALFN being sent applies to the actual frame number at the time it is broadcast.

While the present invention has been described in terms of its preferred embodiment, it will be understood by those skilled in the art that various modifications can be made to the disclosed embodiment without departing from the scope of the invention as set forth in the claims.

What is claimed is:

1. A method for digital audio broadcasting comprising the steps of:
    receiving a plurality of data bits to be transmitted;
    formatting the plurality of data bits into payloads of a plurality of protocol data units;
    inserting header bits at spaced locations within the payloads of the protocol data units; and
    using the protocol data units to modulate a plurality of carriers to produce an output signal;
    wherein a first one of the header bits is offset from an end of the protocol data units.

2. The method of claim 1, wherein:
    individual ones of the header bits are positioned at evenly spaced locations in the payloads of the protocol data units.

3. The method of claim 1, further comprising the step of:
    scrambling the plurality of data bits by generating a pseudorandom code and modulo-2 adding the pseudorandom code and the data bits.

4. The method of claim 1, further comprising the steps of:
    interleaving the plurality of data bits;
    assigning the interleaved bits to interleaver partitions; and
    mapping the interleaver partitions to frequency partitions.

5. A method for digital audio broadcasting comprising the steps of:
receiving a plurality of data bits to be transmitted;
formatting the plurality of data bits into payloads of a plurality of protocol data units;
inserting header bits at spaced locations within the payloads of the protocol data units; and
using the protocol data units to modulate a plurality of carriers to produce an output signal;
wherein the header bits comprise one of the following bit sequences:

[1100101100011011100011100]
[0010110001101100011110011]
[0011001011000110110001111]
[1100110010110001101100001]
[0111001100101100011101100]
[1011000111001100101100001]
[0000111001100101100011011]
[1100011100110010110000110].

6. A method for digital audio broadcasting comprising the steps of:
receiving a plurality of data bits to be transmitted;
formatting the plurality of data bits into payloads of a plurality of protocol data units;
inserting header bits at spaced locations within the payloads of the protocol data units; and
using the protocol data units to modulate a plurality of carriers to produce an output signal;
wherein the protocol data units are processed in a plurality of logical channels and each logical channel is scrambled and encoded separately.

7. The method of claim 6, wherein the logical channels operate at different rates depending upon a service mode.

8. The method of claim 6, wherein each logical channel is scrambled using a maximal-length scrambling sequence using a linear feedback shift register with a primitive polynomial.

9. A transmitter for digital audio broadcasting comprising:
means for receiving a plurality of data bits to be transmitted;
means for formatting the plurality of data bits into payloads of a plurality of protocol data units;
means for inserting header bits at spaced locations within the payloads of the protocol data units; and
means for using the protocol data units to modulate a plurality of carriers to produce an output signal;
wherein a first one of the header bits is offset from an end of the protocol data units.

10. The transmitter of claim 9, wherein:
individual ones of the header bits are positioned at evenly spaced locations in the payloads of the protocol data units.

11. The transmitter of claim 9, further comprising:
means for scrambling the plurality of data bits by generating a pseudorandom code and modulo-2 adding the pseudorandom code and the data bits.

12. The transmitter of claim 9, further comprising:
means for interleaving the plurality of data bits, assigning the interleaved bits to interleaver partitions, and mapping the interleaver partitions to frequency partitions.

13. A transmitter for digital audio broadcasting comprising:
means for receiving a plurality of data bits to be transmitted;
means for formatting the plurality of data bits into payloads of a plurality of protocol data units;
means for inserting header bits at spaced locations within the payloads of the protocol data units; and
means for using the protocol data units to modulate a plurality of carriers to produce an output signal;
wherein the header bits comprise one of the following bit sequences:

[1100101100011011100011100]
[0010110001101100011110011]
[0011001011000110110001111]
[1100110010110001101100001]
[0111001100101100011101100]
[1011000111001100101100001]
[0000111001100101100011011]
[1100011100110010110000110].

14. A transmitter for digital audio broadcasting comprising:
means for receiving a plurality of data bits to be transmitted;
means for formatting the plurality of data bits into payloads of a plurality of protocol data units;
means for inserting header bits at spaced locations within the payloads of the protocol data units; and
means for using the protocol data units to modulate a plurality of carriers to produce an output signal;
wherein the protocol data units are processed in a plurality of logical channels and each logical channel is scrambled and encoded separately.

15. The transmitter of claim 14, wherein the logical channels operate at different rates depending upon a service mode.

16. The transmitter of claim 14, wherein each logical channel is scrambled using a maximal-length scrambling sequence using a linear feedback shift register with a primitive polynomial.

17. A method for receiving a digital audio broadcasting signal, the method comprising the steps of:
receiving a digital audio broadcasting signal comprising a plurality of carriers modulated by a plurality of protocol data units, each of the plurality of protocol data units comprising a payload, the payload comprising a plurality of data bits and a plurality of header bits at spaced locations within the payload; and
producing an output signal in response to the digital audio broadcasting signal;
wherein a first one of the header bits is offset from an end of the protocol data units.

18. The method of claim 17, wherein:
individual ones of the header bits are positioned at evenly spaced locations in the payloads of the protocol data units.

19. The method of claim 17, wherein the plurality of data bits are scrambled by generating a pseudorandom code and modulo-2 adding the pseudorandom code and the data bits.

20. The method of claim 17, wherein the plurality of data bits are interleaved; assigned to interleaver partitions; and the interleaver partitions are mapped to frequency partitions.

21. A method for receiving a digital audio broadcasting signal, the method comprising the steps of:
receiving a digital audio broadcasting signal comprising a plurality of carriers modulated by a plurality of protocol data units, each of the plurality of protocol data units comprising a payload, the payload comprising a plurality of data bits and a plurality of header bits at spaced locations within the payload; and producing an output signal in response to the digital audio broadcasting signal;

wherein the header bits comprise one of the following bit sequences:

| |
|---|
| [1100101100011011000011100] |
| [0010110001101100011110011] |
| [0011001011000110111000111] |
| [1100110010110001101100001] |
| [0111001100101100011011100] |
| [1011000111001100101100001] |
| [0001110011001011100011011] |
| [1100011100110010110001110]. |

22. A method for receiving a digital audio broadcasting signal, the method comprising the steps of:

receiving a digital audio broadcasting signal comprising a plurality of carriers modulated by a plurality of protocol data units, each of the plurality of protocol data units comprising a payload, the payload comprising a plurality of data bits and a plurality of header bits at spaced locations within the payload; and producing an output signal in response to the digital audio broadcasting signal;

wherein the protocol data units are arranged in a plurality of logical channels and each logical channel is scrambled and encoded separately.

23. The method of claim 22, wherein the logical channels operate at different rates depending upon a service mode.

24. The method of claim 22, wherein each logical channel is scrambled using a maximal-length scrambling sequence using a linear feedback shift register with a primitive polynomial.

25. A receiver for receiving a digital audio broadcasting signal, the receiver comprising:

means for receiving a digital audio broadcasting signal comprising a plurality of carriers modulated by a plurality of protocol data units, each of the plurality of protocol data units comprising a payload, the payload comprising a plurality of data bits and a plurality of header bits at spaced locations within the payload; and means for producing an output signal in response to the digital audio broadcasting signal;

wherein a first one of the header bits is offset from an end of the protocol data units.

26. The receiver of claim 25, wherein:

individual ones of the header bits are positioned at evenly spaced locations in the payloads of the protocol data units.

27. The receiver of claim 25, wherein the plurality of data bits are scrambled by generating a pseudorandom code and modulo-2 adding the pseudorandom code and the data bits.

28. The receiver of claim 25, wherein the plurality of data bits are interleaved; assigned to interleaver partitions; and the interleaver partitions are mapped to frequency partitions.

29. A receiver for receiving a digital audio broadcasting signal, the receiver comprising:

means for receiving a digital audio broadcasting signal comprising a plurality of carriers modulated by a plurality of protocol data units, each of the plurality of protocol data units comprising a payload, the payload comprising a plurality of data bits and a plurality of header bits at spaced locations within the payload; and means for producing an output signal in response to the digital audio broadcasting signal;

wherein the header bits comprise one of the following bit sequences:

| |
|---|
| [1100101100011011000011100] |
| [0010110001101100011110011] |
| [0011001011000110111000111] |
| [1100110010110001101100001] |
| [0111001100101100011011100] |
| [1011000111001100101100001] |
| [0001110011001011100011011] |
| [1100011100110010110001110]. |

30. A receiver for receiving a digital audio broadcasting signal, the receiver comprising:

means for receiving a digital audio broadcasting signal comprising a plurality of carriers modulated by a plurality of protocol data units, each of the plurality of protocol data units comprising a payload, the payload comprising a plurality of data bits and a plurality of header bits at spaced locations within the payload; and means for producing an output signal in response to the digital audio broadcasting signal;

wherein the protocol data units are arranged in a plurality of logical channels and each logical channel is scrambled and encoded separately.

31. The receiver of claim 30, wherein the logical channels operate at different rates depending upon a service mode.

32. The receiver of claim 30, wherein each logical channel is scrambled using a maximal-length scrambling sequence using a linear feedback shift register with a primitive polynomial.

33. A transmitter for digital audio broadcasting comprising:

an input for receiving a plurality of data bits to be transmitted;

a processor for formatting the plurality of data bits into payloads of a plurality of protocol data units, and for inserting header bits at spaced locations within the payloads of the protocol data units; and a modulator for using the protocol data units to modulate a plurality of carriers to produce an output signal;

wherein a first one of the header bits is offset from an end of the protocol data units.

34. The transmitter of claim 33, wherein:

individual ones of the header bits are positioned at evenly spaced locations in the payloads of the protocol data units.

35. The transmitter of claim 33, further comprising:

a scrambler for scrambling the plurality of data bits by generating a pseudorandom code and modulo-2 adding the pseudorandom code and the data bits.

36. The transmitter of claim 33, further comprising:

an interleaver for interleaving the plurality of data bits, assigning the interleaved bits to interleaver partitions, and mapping the interleaver partitions to frequency partitions.

37. A transmitter for digital audio broadcasting comprising:

an input for receiving a plurality of data bits to be transmitted;

a processor for formatting the plurality of data bits into payloads of a plurality of protocol data units, and for inserting header bits at spaced locations within the payloads of the protocol data units; and a modulator for using the protocol data units to modulate a plurality of carriers to produce an output signal;

wherein the header bits comprise one of the following bit sequences:

[11001011000110110011100]
[00101100011011000111001]
[00110010110001101100011]
[11001100101100011011000]
[01110011001011000110110]
[10110001110011001011000]
[00011100110010110001101]
[11000111001100101100011]

38. A transmitter for digital audio broadcasting comprising:
an input for receiving a plurality of data bits to be transmitted;
a processor for formatting the plurality of data bits into payloads of a plurality of protocol data units, and for inserting header bits at spaced locations within the payloads of the protocol data units; and
a modulator for using the protocol data units to modulate a plurality of carriers to produce an output signal;
wherein the protocol data units are processed in a plurality of logical channels and each logical channel is scrambled and encoded separately.

39. The transmitter of claim 38, wherein the logical channels operate at different rates depending upon a service mode.

40. The transmitter of claim 38, wherein each logical channel is scrambled using a maximal-length scrambling sequence using a linear feedback shift register with a primitive polynomial.

41. A receiver for receiving a digital audio broadcasting signal, the receiver comprising:
an input for receiving a digital audio broadcasting signal comprising a plurality of carriers modulated by a plurality of protocol data units, each of the plurality of protocol data units comprising a payload, the payload comprising a plurality of data bits and a plurality of header bits at spaced locations within the payload; and
an output for producing an output signal in response to the digital audio broadcasting signal;
wherein a first one of the header bits is offset from an end of the protocol data units.

42. The receiver of claim 41, wherein:
individual ones of the header bits are positioned at evenly spaced locations in the payload of the protocol data units.

43. The receiver of claim 41, wherein the plurality of data bits are scrambled by generating a pseudorandom code and modulo-2 adding the pseudorandom code and the data bits.

44. The receiver of claim 41, wherein the plurality of data bits are interleaved; assigned to interleaver partitions; and the interleaver partitions are mapped to frequency partitions.

45. A receiver for receiving a digital audio broadcasting signal, the receiver comprising:
an input for receiving a digital audio broadcasting signal comprising a plurality of carriers modulated by a plurality of protocol data units, each of the plurality of protocol data units comprising a payload, the payload comprising a plurality of data bits and a plurality of header bits at spaced locations within the payload; and
an output for producing an output signal in response to the digital audio broadcasting signal;
wherein the header bits comprise one of the following bit sequences:

[11001011000110110011100]
[00101100011011000111001]
[00110010110001101100011]
[11001100101100011011000]
[01110011001011000110110]
[10110001110011001011000]
[00011100110010110001101]
[11000111001100101100011]

46. A receiver for receiving a digital audio broadcasting signal, the receiver comprising:
an input for receiving a digital audio broadcasting signal comprising a plurality of carriers modulated by a plurality of protocol data units, each of the plurality of protocol data units comprising a payload, the payload comprising a plurality of data bits and a plurality of header bits at spaced locations within the payload; and
an output for producing an output signal in response to the digital audio broadcasting signal;
wherein the protocol data units are arranged in a plurality of logical channels and each logical channel is scrambled and encoded separately.

47. The receiver of claim 46, wherein the logical channels operate at different rates depending upon a service mode.

48. The receiver of claim 46, wherein each logical channel is scrambled using a maximal-length scrambling sequence using a linear feedback shift register with a primitive polynomial.

* * * * *

UNITED STATES PATENT AND TRADEMARK OFFICE
CERTIFICATE OF CORRECTION

| | | |
|---|---|---|
| PATENT NO. | : 7,305,043 B2 | Page 1 of 1 |
| APPLICATION NO. | : 10/465443 | |
| DATED | : December 4, 2007 | |
| INVENTOR(S) | : Marek Milbar and James C. Stekas | |

It is certified that error appears in the above-identified patent and that said Letters Patent is hereby corrected as shown below:

Column 11, Line 13 should read
"... in block 420 to product ..."

Column 11, Line 63 should read
"... RLS and MPA PDU transports ..."

Column 12, Line 17 should read
"... receives the MPA transport PDU ..."

Column 13, Line 51 should read
"... (MPA Transport) and RLS ..."

Signed and Sealed this

Ninth Day of December, 2008

JON W. DUDAS
*Director of the United States Patent and Trademark Office*